United States Patent [19]
Taniguchi et al.

[11] Patent Number: 5,218,395
[45] Date of Patent: Jun. 8, 1993

[54] CAMERA WITH A MULTI-ZONE FOCUS DETECTING DEVICE

[75] Inventors: Nobuyuki Taniguchi, Nishinomiya; Tokuji Ishida, Daito; Toshio Norita, Sakai; Masataka Hamada, Minamikawachi; Toshihiko Karasaki, Sakai, all of Japan

[73] Assignee: Minolta Camera Kabushiki Kaisha, Osaka, Japan

[21] Appl. No.: 587,560

[22] Filed: Sep. 21, 1990

Related U.S. Application Data

[60] Continuation of Ser. No. 461,533, Jan. 5, 1990, abandoned, which is a division of Ser. No. 361,825, Jun. 1, 1989, Pat. No. 4,910,548, which is a continuation of Ser. No. 136,910, Dec. 21, 1987, abandoned, which is a continuation of Ser. No. 50,739, May 15, 1987, abandoned.

[30] Foreign Application Priority Data

May 16, 1986 [JP] Japan ............................... 61-113315

[51] Int. Cl.⁵ .............................................. G03B 13/00
[52] U.S. Cl. .............................. 354/407; 358/213.19; 358/227
[58] Field of Search ................................ 354/400–409; 250/201, 204; 358/213.19, 227

[56] References Cited

U.S. PATENT DOCUMENTS

| | | | |
|---|---|---|---|
| 3,836,919 | 9/1974 | Matsumoto et al. | 354/403 |
| 4,334,150 | 6/1982 | Herbst et al. | 354/406 |
| 4,387,975 | 6/1983 | Araki | 354/406 |
| 4,410,258 | 10/1983 | Aoki et al. | 354/406 |
| 4,423,936 | 1/1984 | Johnson | 354/403 |
| 4,445,761 | 5/1984 | Ishikawa et al. | 354/402 |
| 4,477,167 | 11/1984 | Ishikawa et al. | 354/400 |
| 4,492,448 | 1/1985 | Ishikawa et al. | 354/406 |
| 4,509,842 | 4/1985 | Taniguchi et al. | 354/402 |
| 4,536,072 | 8/1985 | Taniguchi et al. | 354/403 |
| 4,563,576 | 1/1986 | Matsumura et al. | 354/406 |
| 4,614,418 | 9/1986 | Ishikzaki et al. | 354/407 |
| 4,614,865 | 9/1986 | Hayashi | 250/201 PF |
| 4,636,624 | 1/1987 | Ishida et al. | 354/406 |
| 4,693,581 | 9/1987 | Yamaki et al. | 354/400 |
| 4,768,052 | 8/1988 | Hamada | 354/402 |
| 4,774,401 | 9/1988 | Yamada et al. | 250/201 |
| 4,910,548 | 3/1990 | Taniguchi et al. | 354/407 |
| 4,952,966 | 8/1990 | Ishida et al. | 354/406 |
| 4,979,045 | 12/1990 | Tanaguchi et al. | 358/213.19 |

FOREIGN PATENT DOCUMENTS

| | | |
|---|---|---|
| 52-54806 | 4/1977 | Japan . |
| 52-57825 | 5/1977 | Japan . |
| 56-65121 | 6/1981 | Japan . |
| 56-75607 | 6/1981 | Japan . |
| 56-75608 | 6/1981 | Japan . |
| 56-78823 | 6/1981 | Japan . |
| 57-212407 | 12/1982 | Japan . |
| 58-00508 | 4/1983 | Japan . |
| 58-86893 | 5/1983 | Japan . |
| 58-120225 | 7/1983 | Japan . |
| 58-132733 | 8/1983 | Japan . |
| 59-34519 | 2/1984 | Japan . |
| 59-104628 | 6/1984 | Japan . |
| 59-140408 | 8/1984 | Japan . |
| 59-201008 | 11/1984 | Japan . |
| 60-46513 | 3/1985 | Japan . |
| 60-101516 | 6/1985 | Japan . |
| 60-125817 | 7/1985 | Japan . |
| 60-232534 | 11/1985 | Japan . |
| 60-256279 | 12/1985 | Japan . |

Primary Examiner—Michael L. Gellner
Assistant Examiner—D. Gray
Attorney, Agent, or Firm—Price, Gess & Ubell

[57] ABSTRACT

A camera with a multi-zone focus detecting device has an objective lens mounted on a camera. An image formed by the objective lens is divided into a plurality of zones. In each zone, a focusing condition is detected based on the image formed by the objective lens so as to produce a plurality of focusing condition data. Based on the result of the focusing conditions, one zone is selected. Furthermore, a light which has passed through the objective lens is measured separately in each zone so as to produce a plurality of measured light data. Based on a focusing condition data obtained from the selected zone, the objective lens is driven to an infocus condition. When the objective lens is driven to the infocus condition, a measured light data obtained from the selected zone is used for calculating exposure data with which the exposure is controlled.

9 Claims, 19 Drawing Sheets

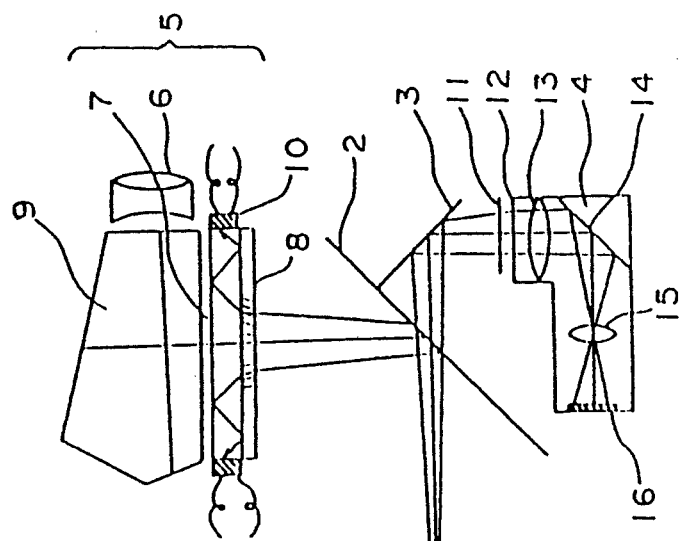
Fig. 1a PRIOR ART
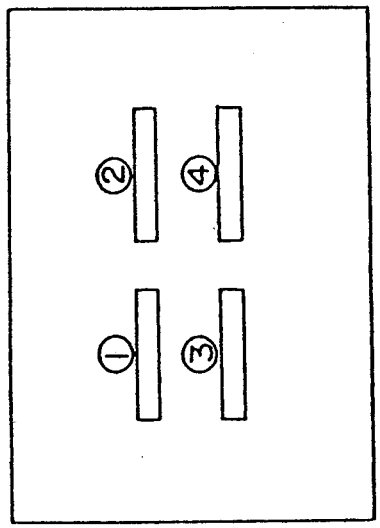
Fig. 1b
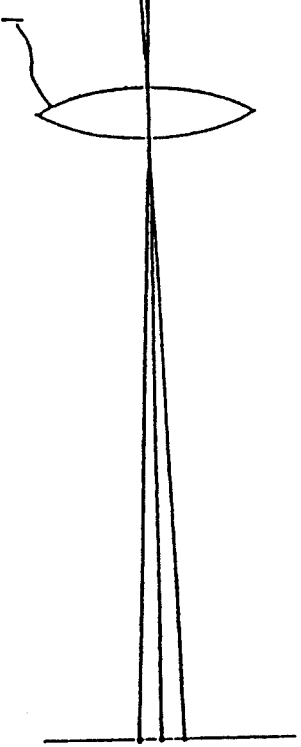
Fig. 2a
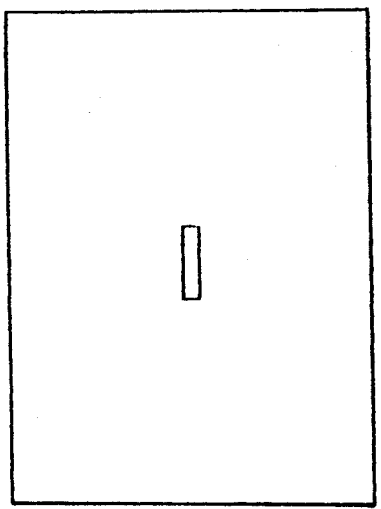

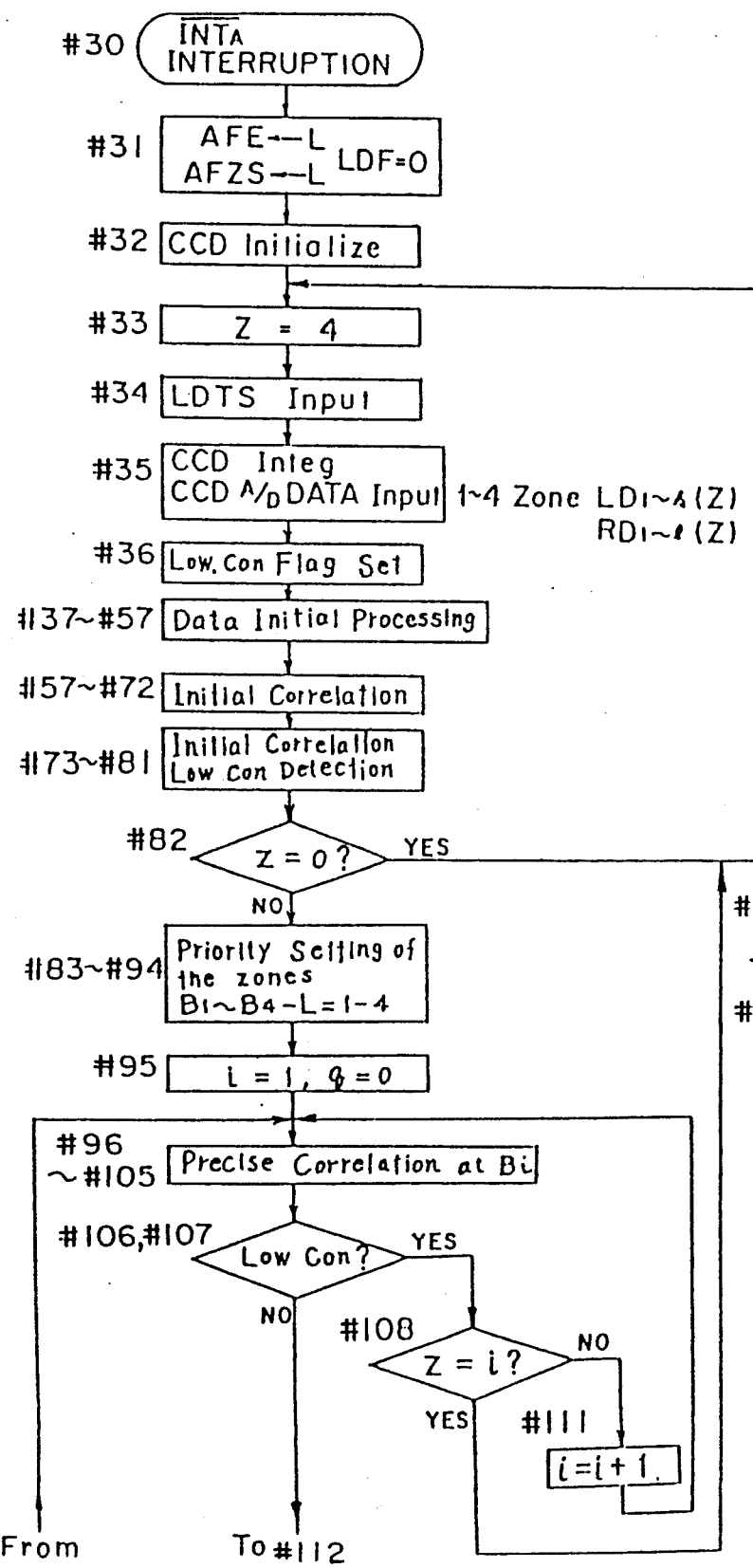
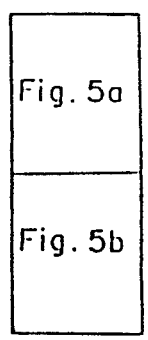
Fig. 5a
Fig. 5

CAMERA WITH A MULTI-ZONE FOCUS DETECTING DEVICE

This is a continuation of application Ser. No. 461,533, filed on Jan. 5, 1990 (abandoned), which is a division of U.S. Ser. No. 361,825, filed on Jun. 1, 1989 (issued as U.S. Pat. No. 4,910,548 on Mar. 20, 1990, for a CAMERA WITH A MULTI-ZONE FOCUS DETECTING DEVICE), which is a continuation of application Ser. No. 136,910, filed on Dec. 21, 1987 (abandoned), which is a continuation application of application Ser. No. 050,739, filed on May 15, 1987 (abandoned).

BACKGROUND OF THE INVENTION

1. Field of the Invention

The present invention relates to a multi-zone light measuring device and, more particularly, to camera having a focus detecting device capable of measuring object lights at a plurality of zones or at a plurality of points in the photographing frame and selecting an optimum value of the measured object light for use in exposure data indication and exposure control.

2. Description of the Prior Art

Conventionally, a camera with a so-called spot light measuring device is known. The spot light measuring device measures the brightness of a small zone in the photographing frame so that a particular object captured by the small zone can be properly exposed on the film. However, the prior art spot light measuring device employed in the camera is so arranged as to measure lights at a certain small zone located at the center of the photographing frame. Therefore, when it is desired to measure lights at a portion other than the center small zone, first, the camera should be so held that the desired portion comes to the center of the photographing frame, and then, the spot light measuring is effected. The result of the spot light measuring is stored in a memory means. Thereafter, the camera is moved so as to bring the spot light measured portion at a desired place in the photographing frame, and then the shutter release operation is carried out. In other words, according to the prior art, it is necessary to carry out the AE lock operation or freeze operation when it is desired to effect the spot measuring of a spot located off the center of the photographing frame.

However, such an AE lock operation or freeze operation as described above is complicated and troublesome. Moreover, in the case where a target object is moving, it is very difficult to perform the AE lock operation with respect to the moving target object, because it is difficult to catch the moving object at the center of the photographing frame for a certain period of time. Furthermore, it is difficult to take pictures of a moving object not only when the moving object is to be located off the center of the photographing frame, but also when the moving object is to be located at the center of the photographing frame.

SUMMARY OF THE INVENTION

Accordingly, an essential object of the present invention is to provide an improved camera which can indicate and control the exposure amount with respect to a target object on the basis of the object light value obtained through the spot light measurement, regardless of the position of the target object in the photographing frame, and without requiring such an operation as the AE lock, etc.

In accomplishing the above-described object, the camera according to the present invention is provided with a focus detection means which detects the focus condition in a plurality of zones or at a plurality of points in the photographing frame, a measuring means for carrying out spot light measurement(s) or in an area including the plurality of zones or points, a first selecting means for selecting, based on the result of the focus detection by the focus detection means, the zone in which a picture-taking lens is to be focused, a second selecting means for selecting the measured light value of a zone corresponding to the zone selected by the first selecting means and, a means for displaying an exposure data and for controlling the exposure based on the measured light value selected by the second selecting means.

Although the term "spot light measurement" implies the light measurement effected in a relatively small zone, the term "spot light measurement" employed herein should be read as including not only the spot light measurement of a small zone, but also the spot light measurement of a relatively wide zone, so long as a part of the photographing frame is measured.

According to the present invention, the focus condition of a picture-taking lens is detected with respect to a plurality of zones or spots in the photographing frame. Of the plurality of zones or spots, one particular zone or spot such as the zone or spot aiming an object located closest to the camera, is selected, and the picture-taking lens is driven automatically to an in-focus condition with respect to the object in the selected zone or spot. Also, light measurement data obtained through the spot measurement of an area corresponding to or covering, the selected zone or spot is used for the display of the exposure data and for the exposure control.

BRIEF DESCRIPTION OF THE DRAWINGS

These and other objects and features of the present invention will become apparent from the following description taken in conjunction with a preferred embodiment thereof, with reference to the accompanying drawings, in which:

FIG. 1a is a view explanatory of a zone for carrying out the focus detection and an object light measurement, according to prior art;

FIG. 1b is a view explanatory of zones for carrying out the focus detection and an object light measurement, according to one embodiment of the present invention;

FIGS. 2a-2d are views explanatory of an optical system employed in a camera according to the preferred embodiment of the present invention;

FIGS. 5a and 5b taken together as shown in FIG. 5 show a flow-chart of an operation of an AF microcomputer employed in the circuit of FIG. 3;

FIG. 13 is a circuit diagram showing one example of a driving circuit for driving the CCD of FIG. 12a;

DESCRIPTION OF THE PREFERRED EMBODIMENT

Figure 2B:
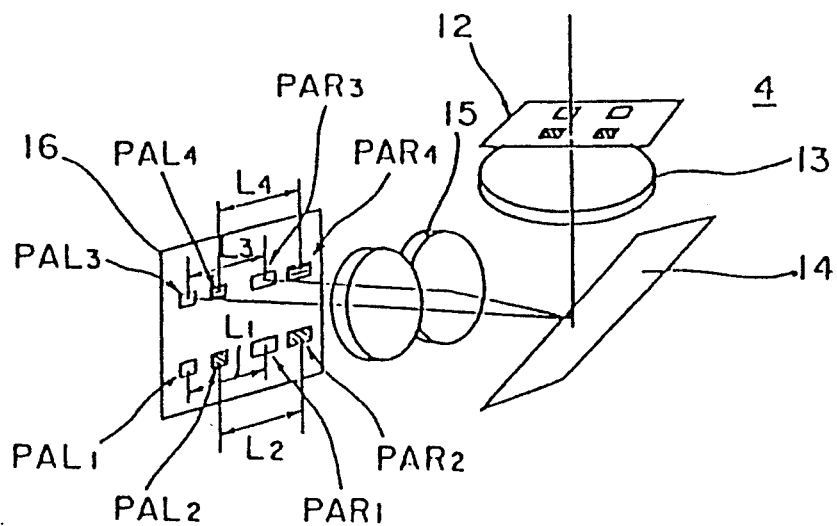

Referring to FIG. 1a, a photographing frame in the viewfinder according to prior art is shown, in which a rectangular frame at the center thereof represents a zone for effecting a focus detection and a spot light measurement. In fact, the light measuring device and the focus detecting device actually employed in the camera, according to prior art have a sensitive zone located in a small area at the center of the viewfinder. Consequently, an automatic focus (hereinafter referred to as an AF) adjustment is carried out such that, a photographer first holds a camera so that the object to be photographed is spotted by the center rectangular frame in the viewfinder, regardless of his or her intention for the framing, so that the target object to be photographed can be detected for the adjustment by the focus detection sensitive zone of the AF device. Then, the photographer locks the focus detected condition by an AF lock means. Then, the photographer is ready to take a picture according to his or her desired framing. When a moving object is to be consequently photographed, since it is very difficult to catch the moving object in the focus detection sensitive zone at all times without failure, the target object moving at high speed often falls out from the focus detection sensitive zone, resulting in an unstable operation of the AF device.

Accordingly, in order to solve the above-described disadvantages and inconveniences, the present invention provides an automatic focusing camera which is, as shown in FIG. 1b, provided with a plurality of focus detection sensitive zones. The spot light measuring zones are located correspondingly to the plurality of the focus detection sensitive zones.

It is statistically found out that the photographs at a high percentage have the main object to be photographed located closest to the camera. Therefore, based on this fact, according to the automatic focusing camera of the present embodiment, it is so arranged that a focus detection sensitive zone detecting an object which is located closest to the camera is automatically selected among a plurality of focus detection sensitive zones. Based on the focus data obtained from the selected zone, the picture-taking lens is automatically focused to the closest object, and at the same time, based on the spot light measurement data obtained from the same selected zone, the display of the exposure data and the exposure control are carried out. Accordingly, the troublesome operation such as to obtain focus data and exposure data before setting the camera to a desired aiming angle can be solved by the camera of the present embodiment. According to the present embodiment, without framing the main object at the center of the photographing frame of the viewfinder, the automatic focus adjustment and the spot light measurement of the main object can be carried out.

FIGS. 2a-2d show an optical system of the camera according to the present embodiment.

Referring to FIG. 2a, there is shown a schematic view of the optical system according to one embodiment of the present invention applied to a single lens reflex camera. In FIG. 2a, a part of the light having passed through a picture-taking lens 1 is reflected by a main mirror 2 and is directed to a view finder section 5. The remaining light is passed through a translucent portion of the main mirror 2 and is reflected by a sub-mirror 3 to direct light towards an automatic focus detecting module 4. The light directed to viewfinder section 5 forms an image on a mat surface of a focusing screen 7 which is then outputted to a photographer's eye through a pentagonal roof prism 9. A part of the light directed to the viewfinder section is scattered by a diffraction grating 8 and is completely reflected between top and bottom faces of the screen 7 and is guided to a spot light measuring element 10 disposed on the side surface of the screen 7.

Figure 2C:
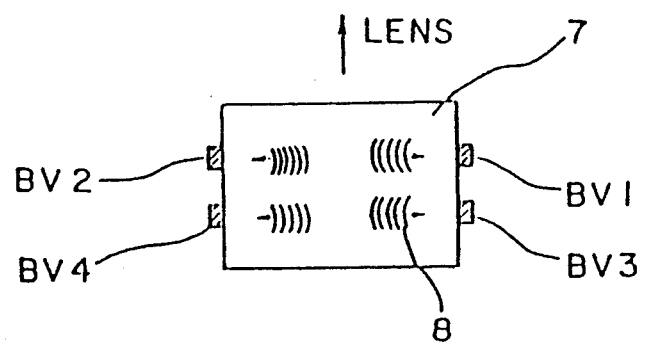

FIG. 2c indicates the arrangement of the diffraction grating 8 and four spot light measuring elements BV1-BV4 provided on the side surface of the focusing screen 7. The diffraction grating 8 has four sections which are placed on mat surface of the screen 7 in a manner as shown in FIG. 2c so that the light is scattered and guided in four different directions as indicated by arrows. The light measuring elements BV1-BV4 are disposed at respective light emission outlets, i.e., at places indicated by the arrows. The light having passed through main mirror 2 and directed to the lower part of the camera body by sub-mirror 3 further passes through an infrared light cut-off filter 11, a mask plate 12 provided at a place approximately equal to a focal plane, a condenser lens 13, a mirror 14 and a pair of re-focusing lenses 15, thereby forming two images on a photoelectric converting element 16. A detailed description will be given hereinbelow with reference to FIG. 2b.

Figure 2D:
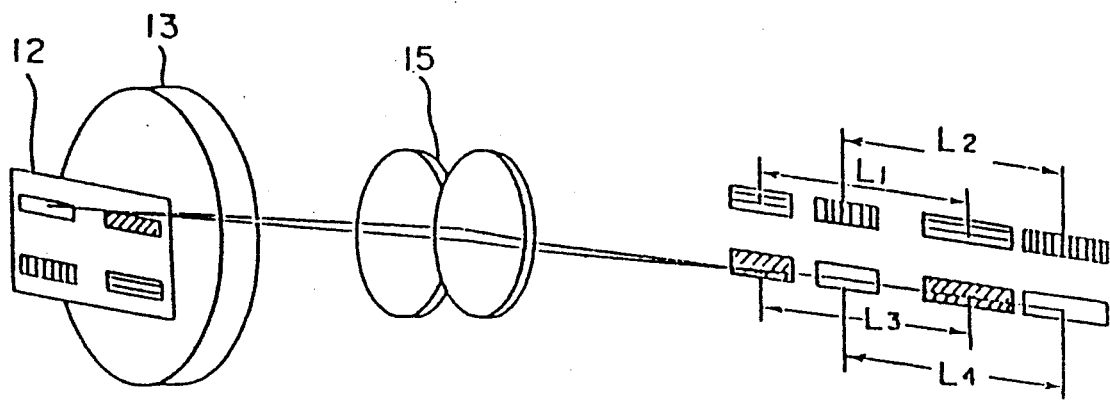

Referring to FIG. 2b, the light passed through infrared light cut-off filter 11 reaches the mask plate 12 placed adjacent the focal plane. Mask plate 12 permits only the light in four zones, first zone, second zone, third zone and fourth zone, to pass therethrough. The light from mask plate 12 in four zones passes through condenser lens 13, and is deflected 90° by mirror 14. Then, the light is divided into two by re-focusing lenses 15, so that for each zone two images, a standard image and a reference image, are formed on photoelectric converting element 16. More specifically: for the first zone, a standard image and a reference image are formed on standard area PAL1 and reference area PAR1, respectively; for the second zone, a standard image and a reference image are formed on standard area PAL2 and reference area PAR2, respectively; for the third zone, a standard image and a reference image are formed on standard area PAL3 and reference area PAR3, respectively; and for the fourth zone, a standard image and a reference image are formed on standard area PAL4 and reference area PAR4, respectively. When the distance or deviation $X_z$ ($z=1$ through 4) between the standard area $PAL_z$ and a reference area $PAR_z$ is equal to a predetermined deviation $L_z$, it is determined that the object is in the in-focus condition. When the deviation $X_z$ is larger than $L_z$, it is determined that the object is in the rear-focus condition in which the object is located too close to the picture-taking lens with respect to the infocusing condition of the lens. On the contrary, when the deviation $X_z$ is smaller than the deviation $L_z$, it is determined that the object is in the front-focus condition in which the object is located too far away from the picture-taking lens with respect to the infocusing condition of the lens. When the optical system of FIG. 2b is developed, it will be as shown in FIG. 2d.

Figure 3:
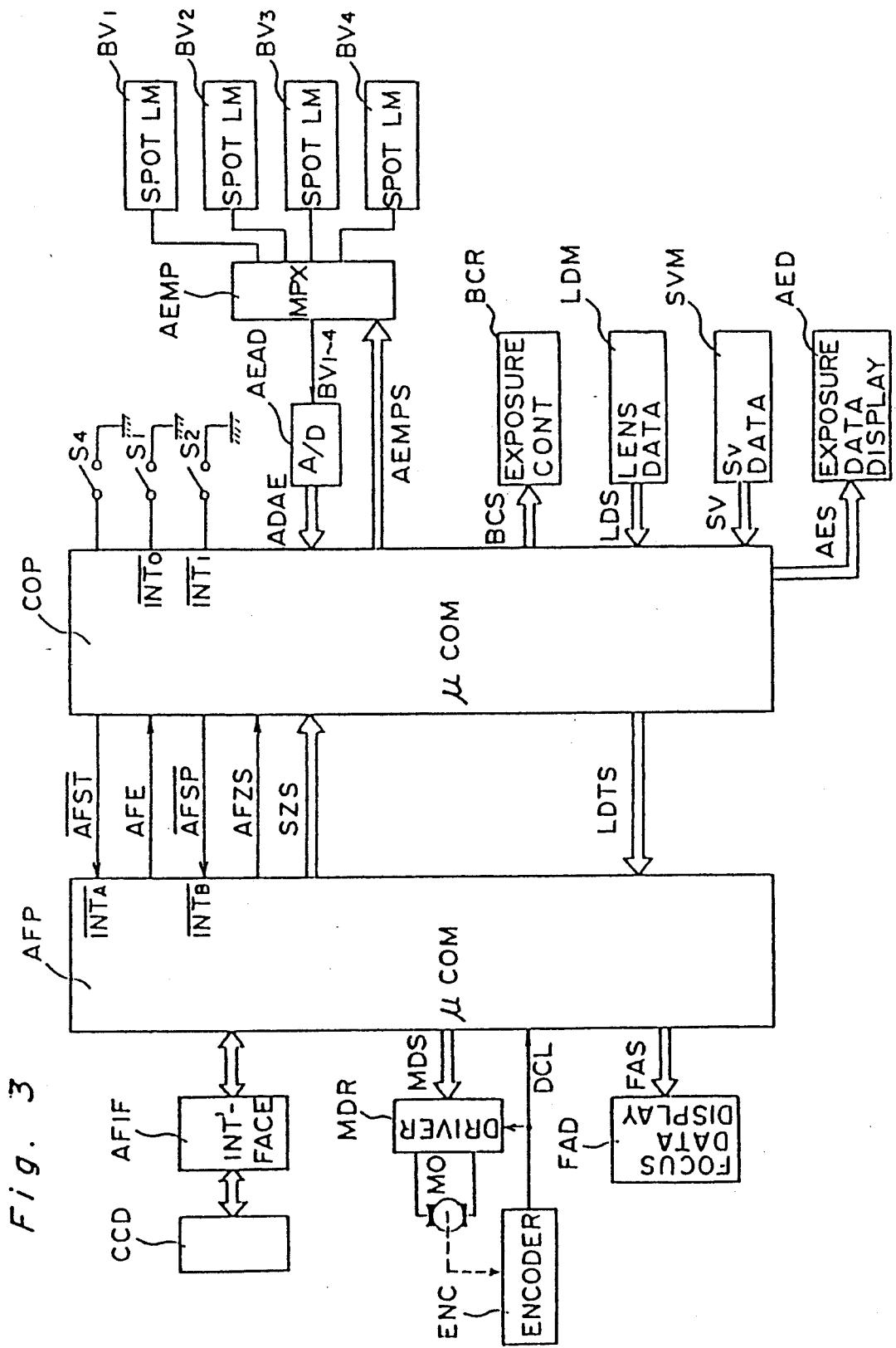
FIG. 3 is a block diagram showing an entire circuit employed in the camera of FIG. 2.

An electric circuit arrangement of the camera according to the present embodiment is shown in FIG. 3.

The camera of the present embodiment is controlled by two microprocessors, i.e., a microprocessor COP which controls the entire camera (referred to as a camera-control microcomputer hereinafter) and a microprocessor AFP which controls the automatic focusing (hereinafter referred to as an AF microcomputer). A reference character S1 designates a switch for starting the measurement of the object light and the AF automatic focusing operation; S2 designates a release switch for effecting the film exposure, thereby starting the photographing operation of the camera; S4 designates a switch which is turned off when the main mirror and a shutter curtain of a focal plane shutter are charged, and is turned on after the completion of the exposure. A signal to open or close each of the above-described switches is inputted to the camera-control microcomputer COP.

An output generated from each of the spot light measuring elements BV1–BV4 is selectively outputted by a selecting signal AEMPS from the camera-control microcomputer COP in a multiplexer AEMP and, inputted to the camera-control microcomputer COP in the form of a digitalized value by an A/D converting circuit AEAD. The camera-control microcomputer COP receives, from a lens data outputting circuit LDM, data LDS which is necessary for the AF control. Data LDS includes the conversion coefficient for converting the defocus amount detected in an automatic focus detecting part to an appropriate amount corresponding to individual lenses by which the lens is focused, the maximum aperture value of the lens, the minimum aperture value of the lens, etc. Of the data LDS, only the data necessary for the AF control are transferred to the AF microcomputer AFP.

The camera-control microcomputer COP receives data from an ISO data outputting means SVM, which produces the film sensitivity data on the Apex value Sv. The camera-control microcomputer COP calculates the exposure data on the basis of the inputted data, and produces an exposure value signal AES to an exposure display AED for displaying the exposure data. Furthermore, after a release signal for the release switch S2 is applied to the camera-control microcomputer COP, the camera-control microcomputer COP outputs an exposure controlling signal BCS to an exposure control BCR, thereby controlling the exposure.

AF (automatic focusing) microcomputer AFP drives an AF sensor composed of CCDs through an AF interface AFIF. An output from the AF sensor CCD is processed in the analog form and is converted to the digital form by the AF interface AFIF, such that the digitalized image information is applied to the AF control microcomputer AFP which, in response to the receipt of the digitalized image information, carries out the AF calculation to obtain the de-focus amount.

Furthermore, the AF control microcomputer AFP converts the de-focus amount to the shifting amount of the lens on the basis of the lens data supplied from the camera-control microcomputer COP, whereby a motor driver MDR drives a motor MO by an amount corresponding to the lens shifting amount. While motor MO is being driven, the rotating amount of the motor is detected by an output signal DCL from a motor encoder ENC, which is also fed back to motor driver MDR.

Moreover, AF control microcomputer AFP is arranged to indicate the in-focus condition by outputting an in-focus signal FAS to an in-focus data display device FAD, for the purpose of confirmation of the in-focus condition, etc.

The signal exchange between the camera-control microcomputer COP and the AF microcomputer AFP will be described hereinbelow. An AF start signal AFST sent from the camera-control microcomputer COP to AF microcomputer AFP is for starting the AF operation. In FIG. 3, a bar extending over AFST indicates that AF microcomputer AFP starts the AF operation in response to the change of the AF start signal AFST from a HIGH level to a LOW level.

When an AF end signal AFE sent from AF microcomputer AFP to camera-control microcomputer COP is changed from a LOW level to a HIGH level, it is indicated that the AF operation is completed and that the in-focus condition is obtained. A pulse signal, AF stop signal AFSP, is sent from camera-control microcomputer COP to AF microcomputer AFP so as to stop the AF operation.

Moreover, an AF zone selecting signal AFZS, when it becomes a HIGH level, indicates that one of the four zones described above is selected. A signal SZS represents the selected zone. A data bus LDTS is provided for transmitting AF lens data to the AF microcomputer AFP only the data necessary for the AF operation among the lens data LDS inputted from lens data outputting circuit LDM by camera-control microcomputer COP.

With reference to the flow-charts shown in FIGS. 4, 5a and 5b, the operation of the above-described circuit will be described particularly with respect to the camera-control microcomputer COP and the AF microcomputer AFP.

Figure 4:
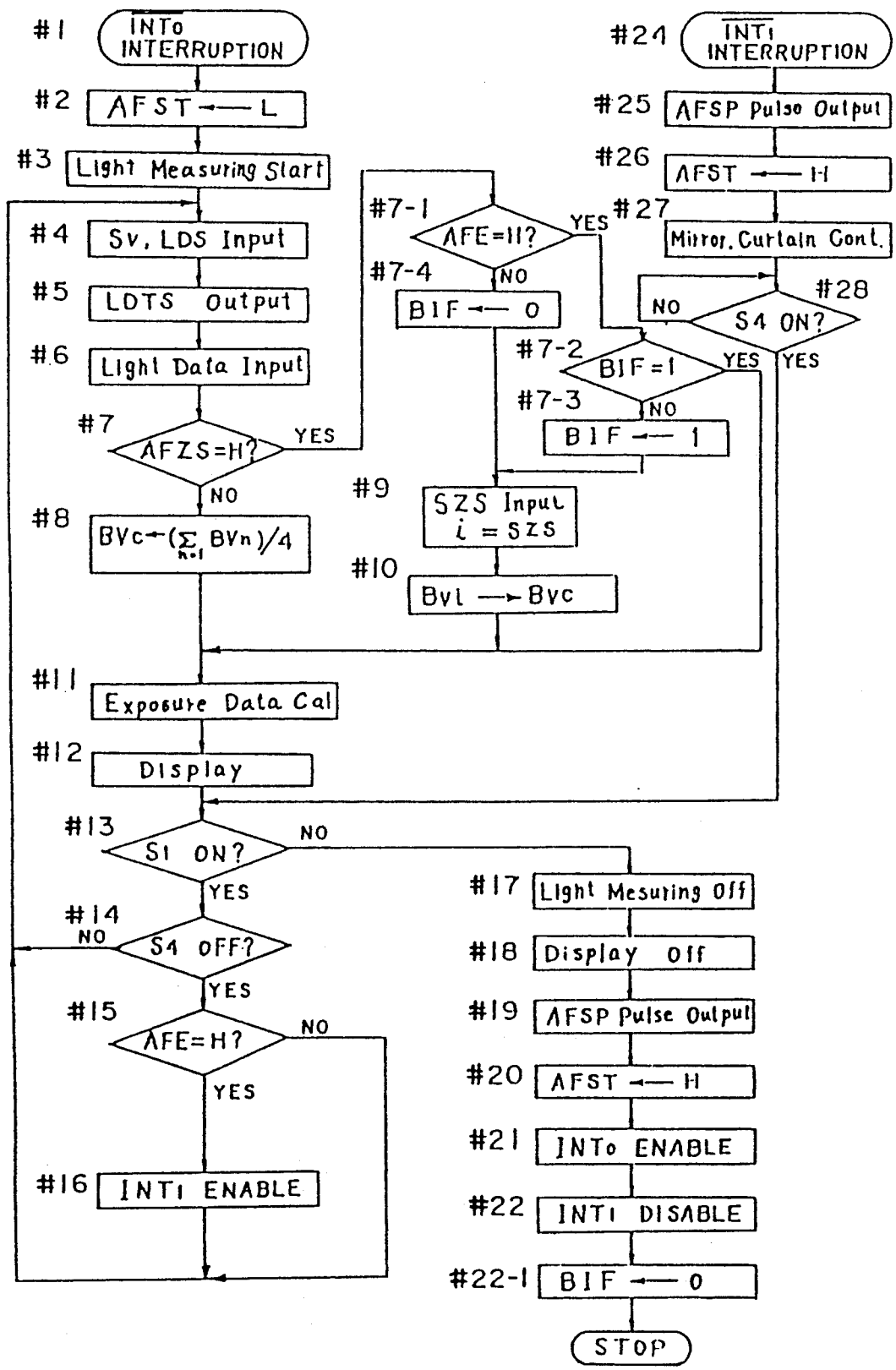
FIG. 4 is a flow-chart showing an operation of a microcomputer employed in the circuit of FIG. 3.
Figure 5B:
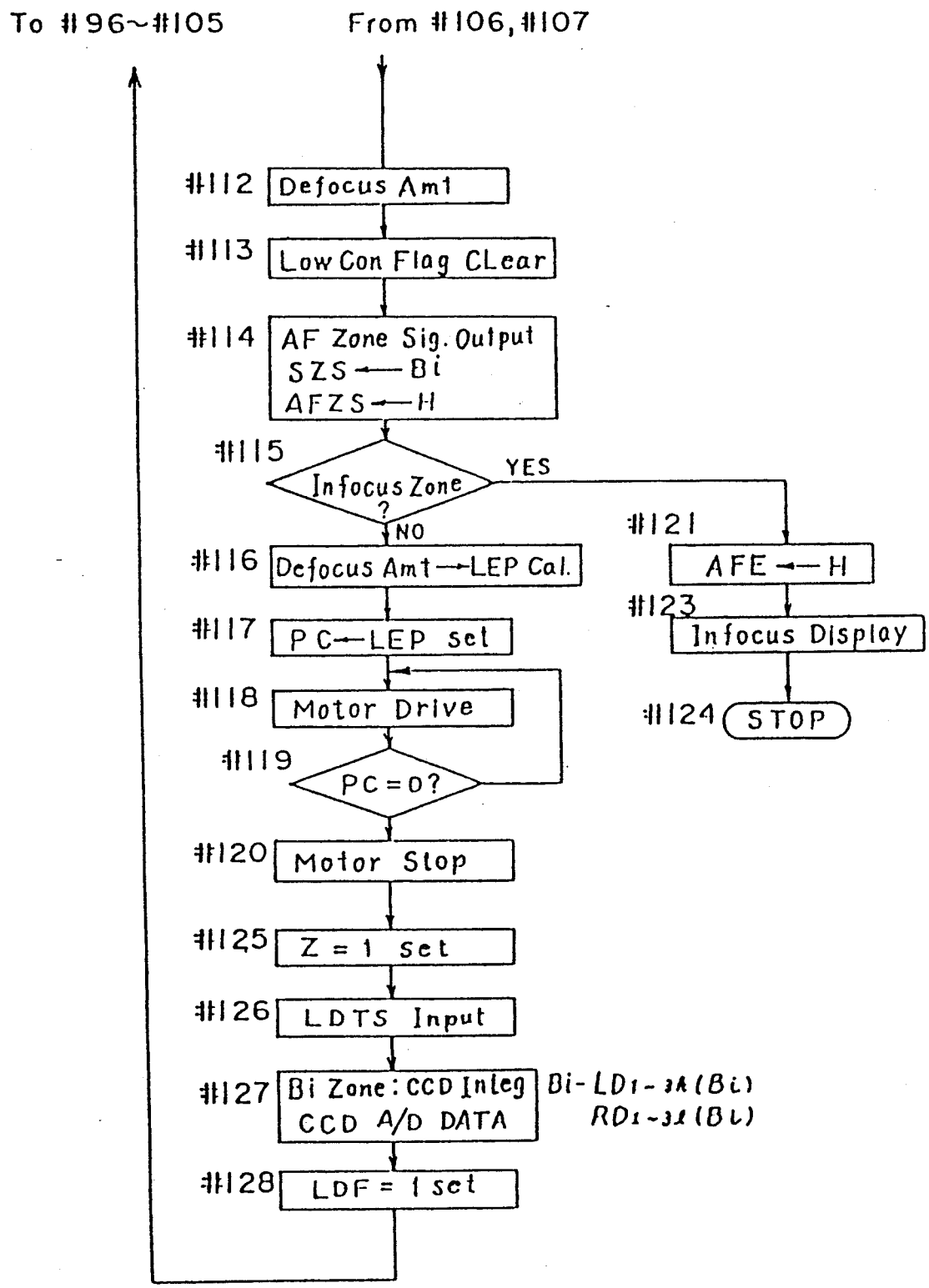

When a release button is depressed halfway, switch S1 turns on, so that an interruption signal is added to an interruption terminal INT0 of camera-control microcomputer COP (step #1 in FIG. 4). This interruption signal enables camera-control microcomputer COP, i.e., drives camera control microcomputer COP out of the stop mode, so that start signal AFST is changed from a HIGH level to a LOW level, thereby activating the AF control microcomputer AFP (step #2 in FIG. 4) to start the light measuring operation (step #3 in FIG. 4). Then, camera-control microcomputer COP receives data necessary for calculating the exposure, such as, Sv data from ISO data outputting means SVM and various lens data LDS from lens data outputting means LDM (step #4 in FIG. 4). Among them, only the lens data necessary for the AF operation are further transmitted to AF control microcomputer AFP (step #5 in FIG. 4). The light measurement data are inputted to camera-control microcomputer COP from AF control microcomputer AFP at step #6.

Thereafter, camera-control microcomputer COP determines whether or not the AF zone selecting signal AFZS from AF microcomputer AFP is changed to a HIGH level (step #7 in FIG. 4). The AF zone selecting signal AFZS, which will be further described in detail later, is in a LOW level state at the beginning of the operation.

When the AF zone selecting signal AFZS is at a LOW level (indicating that any AF zone has not yet been selected), camera-control microcomputer COP calculates an average of the light measuring data BV1–BV4 and takes the average as the measured value (step #8), and further carries out an on each data (step #11 in FIG. exposure calculation based 4). Upon completion of the exposure calculation, camera-control microcomputer COP produces the result of the calculation to the exposure display device AED for the display (step #12). After the above-described operations in one loop are completed, it is detected whether or not switch S1 1 is continuously depressed (step #13). If switch S1 is kept depressed, it is checked whether or not the shutter is completely charged (step #14) and whether or not the infocus condition is obtained (step #15).

If the results of both steps #13 and #14 are YES, an interruption from the interruption terminal INT1 is permitted so that the shutter release can be effected (step #16). Thereafter, the program is returned to step #4 in which the data are inputted again.

On the other hand, if at least one of the results of steps #13 and #14 is NO, the program returns back to step #4 without passing through step #16 so that the shutter release permission cannot be given. If switch S1 is not depressed at step #13, the light measurement and the display of the exposure are stopped at steps #17 and #18, with the AF stop signal AFSP being outputted so as to stop the AF operation at step #19, and also the AF start signal AFST being brought into a HIGH level at step #20. Then, the interruption from the interruption terminal INT0 is permitted at step #21, while the interruption by the terminal INT1 from switch S2 is prohibited at step #22. Then, a flag BIF is reset at step #22-1, and thus the AF operation is stopped, i.e,. AF microcomputer AFP enters the stop mode.

On the other hand, AF microcomputer AFP starts the operation when the stop mode is interrupted as the AF start signal AFST sent from the camera-control microcomputer COP is applied to an interruption terminal INTA of AF microcomputer AFP (step #30 in FIG. 5a). When AF microcomputer AFP starts the AF operation, the AF end signal AFE is dropped to a LOW level and also the AF zone selecting signal AFZS is dropped to a LOW level, so that AF microcomputer AFP provides a signal to camera-control microcomputer COP indicating that the AF zone has not yet been selected, and at the same time, the AF microcomputer AFP resets a flag LDF, which flag is set when the lens is driven (step #31 in FIG. 5a).

Next, after the CCD is initialized (step #32 in FIG. 5a), a variable Z, representing the AF zone number, is set as "4" (step #33), and the lens data LDTS necessary for the AF operation is inputted from the camera-control microcomputer COP (step #34). Then, the CCD is controlled. First, the integration of the CCD is effected. When the integrated light amount reaches a proper level, or when a predetermined maximum integration time lapses as occurred when the brightness of the object to be photographed is relatively low, a shift pulse is applied to the CCD. Accordingly, the data of the CCD, namely, the image information in the digital form is inputted (step #35 in FIG. 5a). Although the operation will be described more in detail later, it is to be noted here that the data from the CCD in all the zones 1–4 are inputted.

A low contrast flag, used for indicating whether or not the object to be photographed has a low contrast, is set (step #36 in FIG. 5a). The low contrast flag is cleared only when the focus detection effected at the preceding CCD integration was possible. In this situation, since the CCD integration is carried out for the first time, the low contrast flag is set. The flag will be utilized later so as to decide whether the low-contrast scan should be carried out, or whether the in-focus detection should be carried out again with the lens being remained in the position as it is. It is to be noted here that the low-contrast scan is an operation effected when the contrast of the object to be photographed is relatively low, and is carried out such that the lens is driven all over the driving range thereof, for example, in one reciprocal movement to find a position which can provide a proper contrast of the object.

In order to decide the priority of the four zones for the focus detection calculation, a data initial processing (steps #37–#57), an initial correlation (steps #57–#72), an initial correlation low contrast detection (steps #73–#81) and a priority setting of the zones (steps #83–#94) are carried out. These operations will be described later in detail, but in brief, the operations are such that, the zone including the closest object among the objects within the photographing frame, in other words, the zone having the largest image deviation among image deviations L1, L2, L3 and L4 (FIG. 2d) calculated in each zone is selected and the focus detection is effected only with respect to the particular zone. This is because, if the precise correlation calculation is conducted for all of the zones, the calculation time may be undesirably prolonged.

It is checked in step #82 whether or not the variable Z is "0", and if the variable Z is "0", it is decided that all of the AF zones are in low contrast.

The determination of the low contrast at this stage of the operation is performed in a simple manner as described above in a small range of determination because the determination of the low contrast will be carried out again after the precise correlation. With respect to the zone selected by the initial correlation, the in-focus condition detection calculation is further carried out with more accuracy in the precise correlation calculation (steps #96–#105). Based on the above precise correlation calculation, the low contrast check is further performed (steps #106, #107). When the selected zone has a low contrast, the program goes through steps #108 and #111, and carries out the precise correlation calculation (steps #96–#105) for another zone. The steps #108, #111, #96–#105 are repeated, so that the contrast conditions in the zones are detected in turns in the priority order as determined in steps #83–#94 until a zone with a sufficient contrast is found. If a zone with a sufficient contrast is found, the program goes to step #112 for the defocus amount calculation. If all of the four zones has a low contrast, the program goes to step #109. At step #109, if the low contrast flag is set, the situation is assumed that the lens is considerably away from the in-focus position with respect to the object to be photographed, and therefore it is considered that the detection of the de-focus amount is not possible. In such a situation, a low contrast scan operation (step #110) is carried out by one reciprocal movement of the lens between the nearest focusing position to the infinite focusing position. During the reciprocal movement of the lens, the CCD integration and the calculation are repeated many times so as to search a lens position at which the defocus amount can be detected.

When it is detected that the zone is not in the low contrast and the de-focus amount is calculated (step #112), the low contrast flag is cleared (step #113), and this situation of the lens is stored. Thus even if it is detected in the next integration that the zone has a low contrast, the integration and calculation of the CCD are carried out in all the zones with the lens remained as it is. By so doing, even if the aiming object moves from one zone to another without a substantial change in the distance between the object and the camera, the low contrast scanning will not be carried out just because that the zone as selected in the previous cycle is now in the low contrast condition. Thus, it is possible to prevent the lens from losing its position as the result of the low contrast scanning.

Thereafter, in order to inform camera control microcomputer COP of the light measuring zone as selected by AF control microcomputer AFP, a zone signal SZS representing the zone selected by AF control microcomputer AFP is transferred to camera-control microcomputer COP, and then the AF zone selecting signal AFZS changes its state to a HIGH level at step #114. Thereafter, when the operation in camera-control microcomputer COP comes to step #7, the program goes to step #7-1 and further to step #9, so that the AF zone signal SZS is inputted in order to conduct the spot light measurement calculation based on the signal obtained from the light measuring element corresponding to the selected zone (step #10). This is explained in detail hereinbelow.

If the AF zone selecting signal AFZS is detected as in a HIGH level in step #7 in FIG. 4, it is further detected in step #7-1 whether or not the AF end signal AFE is HIGH. Then, when the AF end signal AFE is HIGH indicating that the in-focus condition is obtained, it is further detected at step #7-2 whether a flat BIF is set or not. In the case where the flag BIF is not set, the flag BIF is set at step #7-3. Then, the program proceeds to step #9. On the contrary, in the case where the flag BIF is set, the program goes to step #11, without changing the Bvc in step #10. As apparent from the above, the light measuring data of the zone (identified by the AF zone selecting signal AFZS) selected immediately after the lens has reached the in-focus condition is AE locked. If the AF end signal AFE is found not to be HIGH in step #7-1 indicating that the lens has not reached the in-focus condition, the flag BIF is reset in step #7-4. Then, the program goes to step #9.

Thereafter, the AF control microcomputer AFP detects whether or not the calculated de-focus amount is within the predetermined in-focus zone (step #115). When it is detected that the lens is positioned within the in-focus zone, the AF microcomputer AFP changes the AF end signal AFE to be HIGH, indicating the completion of the AF operation to camera-control microcomputer COP, together with the display of the in-focus condition, and permitting the shutter release (steps #121 and #123).

In contrast, when it is detected at step #115 that the lens is out of the in-focus zone, the shifting amount of the lens is calculated (step #116) in the form of a number of pulse LEP to be counted by the encoder ENC with the use of the conversion coefficient with which the de-focus amount is converted to the lens shifting amount inputted previously. Motor MO is accordingly driven by the number of the calculated pulse counts which number is counted by a counter PC (steps #117, #118 and #119), thereby to move the lens by the calculated lens shifting amount, and then the motor is stopped (step #120).

After the above-described operation, the integration of the CCD is carried out again in order to check again whether or not the lens is properly focused. At this time, to shorten the operating time, the integration is carried out only in the selected CCD zone through the preceding calculation (step #127). Before this, the variable Z is set to be "1", and the data LDTS necessary for the AF operation is inputted to AF microcomputer AFP (steps #125 and #126) so that the low contrast detection can be carried out only in the selected CCD zone. Then, the precise correlation calculation only with respect to the selected CCD block is conducted, and the lens is shifted in accordance with the result of the focus detection. If it is detected at this stage that the selected CCD is in the low-contrast, the lens is held in the position as it is, and the operations from the integration of the CCD in all zones are repeated without moving the lens.

The foregoing description is related to the fundamental operation of the automatic focusing camera provided with an automatic focus adjusting means which adjusts the focusing condition of the lens irrespective of the position of the target object in the photographing frame and, an exposure control means which controls the exposure by the spot light measurement with respect to the target object.

Next, the description is directed to the details of the operations for the data initial processing (FIG. 6), the initial correlation (FIG. 7), the initial correlation low-contrast detection (FIG. 8) and the priority setting of the zones (FIG. 9), which are arranged from a viewpoint of reducing the calculation time.

First, the data initial processing routine will be described in connection with FIG. 6. At step #37, a zone data Z is set to be "1" identifying one of the four AF zones. At step #38, a cumulative contrast data C(Z) is set to be "0" indicating a cumulative contrast value to be zero at the beginning, and at step #39, a cycle number data j indicating the number of contrast calculation cycles carried out for one AF zone is set to be "0".

Then, at step #40, a difference of the A/D converted data between two adjacent picture elements in the standard area in the CCD is taken, and the difference is checked whether it is positive or negative. Each time the difference is checked, sign data $Ld_j$ holds "1" (step #41) or "0" (step #42) when the detected result is positive or negative, respectively. More specifically, when each picture element in the standard area is producing a data $LD_j$, a calculation:

$$LD_j(Z) - LD_{j+1}(Z) \tag{1}$$

is carried out in step #40, a result of which is judged whether it is positive or negative. In the case where the result is positive, the sign data $Ld_j$ is made "1" in step #41, while in the case where the result is negative, the sign data $Ld_j$ is made "0" in step #42.

The same calculation as formula (1) is carried out in step #43, and the obtained difference represents a contrast value C. An absolute value $|C|$ is taken and is added to a cumulative contrast value C(Z) (step #44), thereby obtaining a sum of the absolute values |C|s up to the present calculation cycle. Then the cycle number data j is increased by "1" in step #45. The operations of steps #38–#45 are repeated until the cycle number data j becomes (k−1) (k is the number of picture elements provided in the standard area) (step #46).

Therefore, by repeating steps #40–#46 for (k−1) cycles, sign data $Ld_1(1)$, $Ld_2(2)$, ..., $Ld_j(1)$, ... and $Ld_{k-1}(1)$ are stored in AF microcomputer AFP which represent a contrast change distribution along the standard area in the first AF zone, and at the same time, the cumulative contrast value C(1) is also stored. Similar data will be stored for the second, third and fourth AF zones, as described below.

When the cycle number data j becomes equal to (k−1) in step #46, it is detected in step #47 whether or not the zone data Z representing the AF zone number is "4". In this manner, the operations of steps #38–#45 for each the four AF zones are carried out. In the case where the zone data Z is not "4", the zone data Z is added with "1" in step #48, so that the operation returns to step #38. The operations in step #38–#47 will be repeated until the zone data Z becomes "4", i.e., until four standard areas are processed. Accordingly, data representing the contrast change distribution and the cumulative contrast value are stored for each of the first, second, third and fourth AF zones.

When the zone data Z becomes "4" in step #47, the program advances to step #49. In steps #49–#57, operations similar to steps #37–#47 (excluding steps #38, #43 and #44) are carried out. In steps #49–#57, four reference areas are processed. It is to be noted here that, in steps #49–#57, instead of the sign data $Ld_j$, a sign data $Rd_j$ is used for holding "1" or "0" for the indication of positive or negative of the obtained difference between two neighboring picture elements in the reference area. Also, l, which is greater than k, represents the number of the picture elements provided in the reference area.

Figure 6:
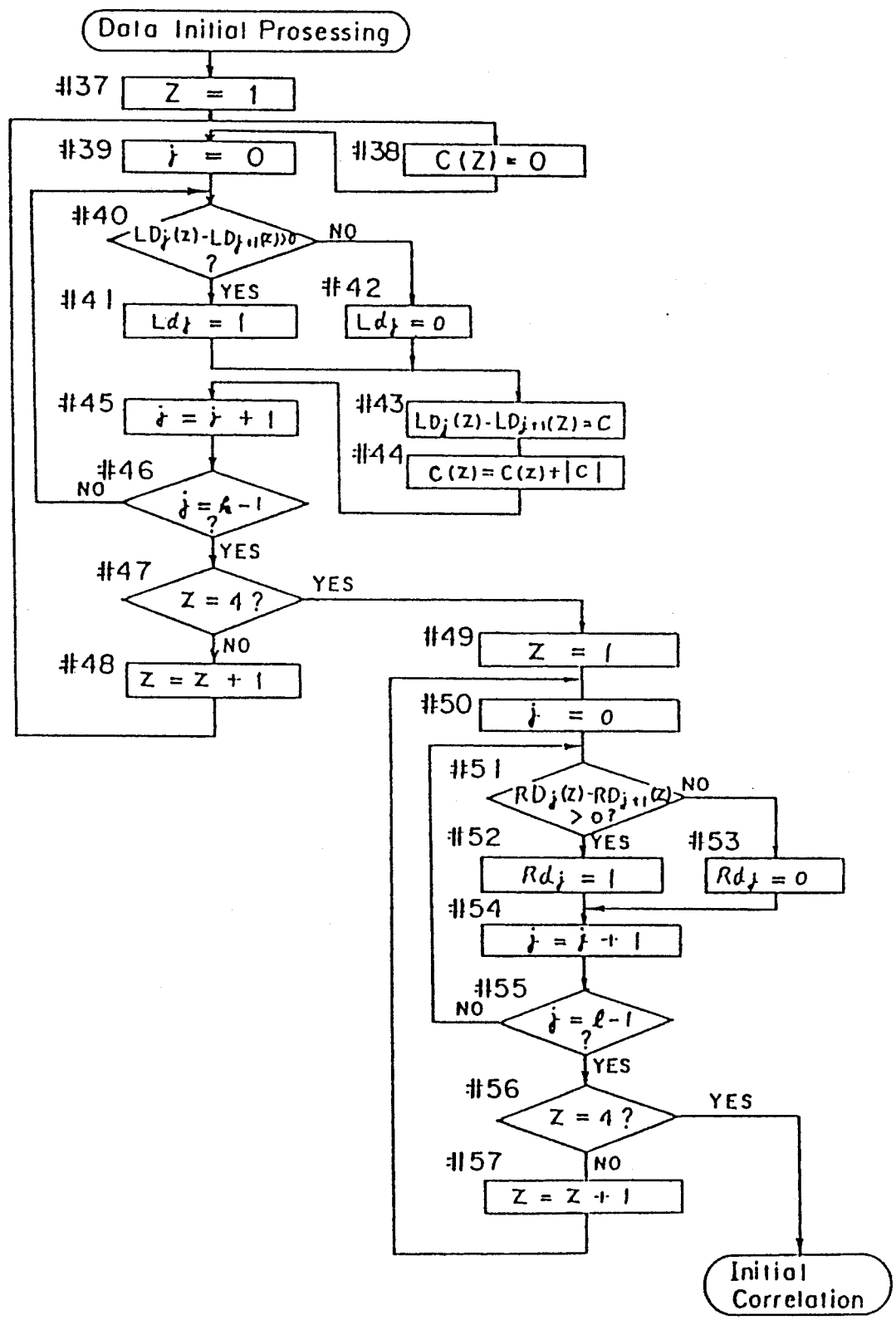
FIGS. 6-9 are flow-charts respectively showing operations of the data initial processing routine, the initial correlation routine, the initial correlation low contrast detection routine and the priority setting routine of the zones.

Thus, in the manner described above, for the first to fourth standard areas, the cumulated contrast values C(Z) (Z=1 through 4) and the contrast change distributions:

$Ld_1(Z)$, $Ld_2(Z)$, ..., $Ld_j(Z)$, ... and $Ld_{k-1}(Z)$ are obtained, and for the first to fourth reference areas, the contrast change distributions:

$Rd_1(Z)$, $Rd_2(Z)$, ..., $Rd_j(Z)$, ... and $Rd_{l-1}(Z)$ (l is greater than k)

are obtained, thereby completing the initial processing operation (FIG. 6).

Figure 7:
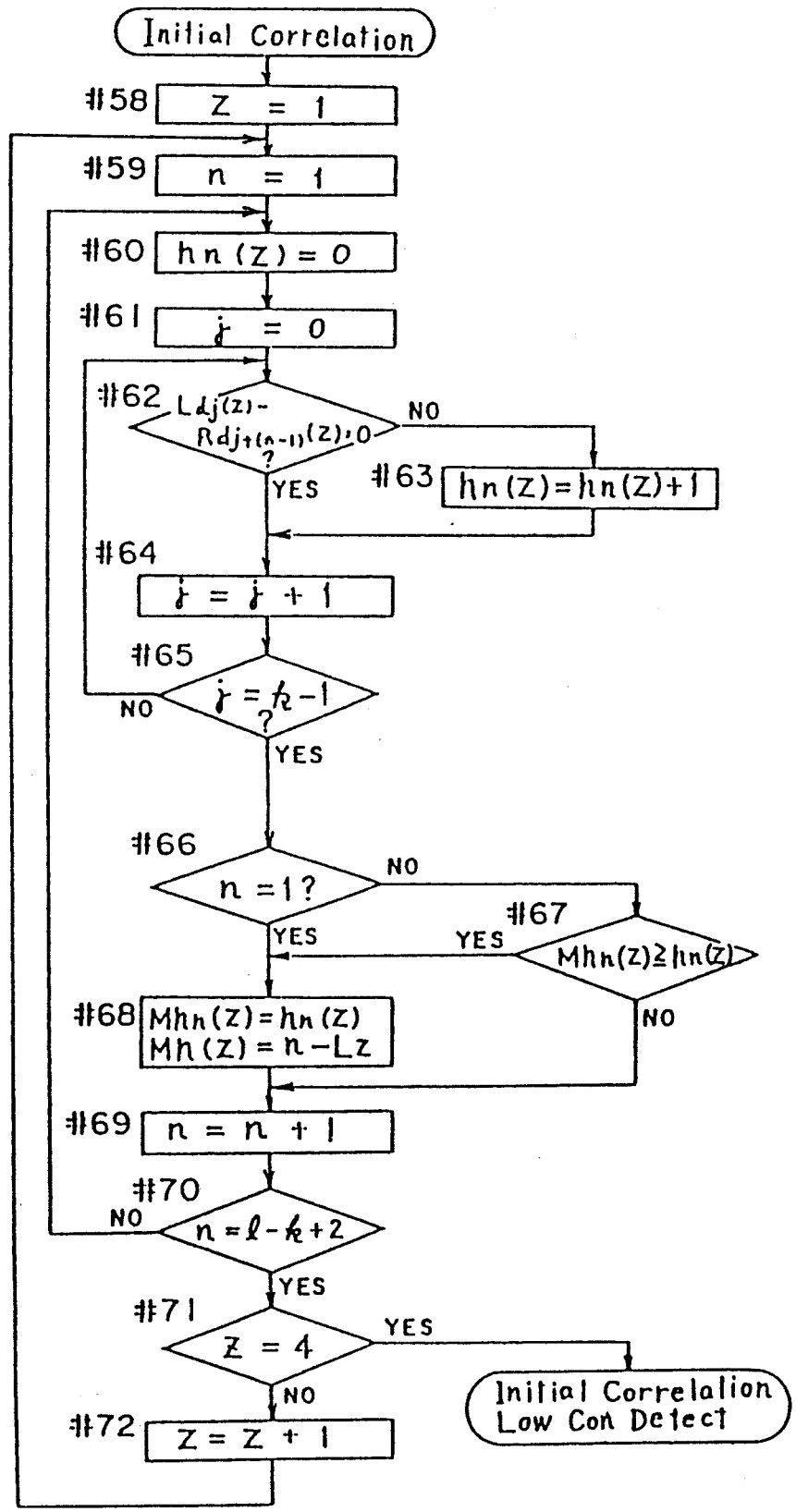

Referring to FIG. 7, the initial correlation routine will be described. At step #58, the zone data is set to be "1" identifying one of the four AF zones. At step #59 a shift data n is set to be "1", at step #60 a correlation data hn(Z) is set to be "0", and at step #61 the cycle number data j is set to be "0" indicating the number of contrast calculation cycles carried out for one AF zone.

At step #62, a calculation $$Ld_j(Z) - Rd_{j+(n-1)}(Z) \qquad (2)$$

is carried out to obtain a difference between the contrast change distribution of the standard area and that of the reference area.

More specifically, for the first (k−1) cycles of operations through steps #62–#65, since shift data n=1, a difference between the contrast change distribution:

$Ld_1(1)$, $Ld_2(1)$, ..., $Ld_j(1)$, ... and $Ld_{k-1}(1)$ of the standard area and the contrast change distribution:

$Rd_1(1)$, $Rd_2(1)$, ..., $Rd_j(1)$, ... and $Rd_{k-1}(1)$ of the reference area is obtained. To this end, a difference between sign data $Ld_j$ in the standard area and the sign data $Rd_j$ in the reference area is calculated at step #62 as indicated below:

$Ld_1(Z) - Rd_1(Z)$
$Ld_2(Z) - Rd_2(Z)$
$Ld_3(Z) - Rd_3(Z)$

.
.
.

$Ld_{k-1}(Z) - Rd_{k-1}(Z)$

In each subtraction, if the difference is equal to zero indicating the concordance between sign data $Ld_j$ and $Rd_j$, the program proceeds to steps #64 and #65 so as to carry out the next subtraction. On the contrary, if the difference is not equal to zero indicating the discordance between sign data $Ld_j$ and $Rd_j$, the program follows step #63 to count the number of occurrences of such a discordance in each comparison between the contrast change distributions $Ld_j(Z)$ and $Rd_j(Z)$. The counted result is stored as the correlation data hn(Z).

When the correlation data hn(Z) has a great number, indicating that the discordance occurred many times, it can be said that the correlation is low or poor. On the other hand, when the correlation data hn(Z) has a small number, indicating that the discordance occurred only a few times, it can be said that the correlation is high or good.

When (k−1) cycles of operations through steps #62–#65 are carried out, the program goes to step #66, at which it is detected whether n=1 or not. At this stage, since shift data n=1, the program goes to step #68 at which the correlation data hn(Z) is stored as a minimum correlation data Mhn(Z), and also, (n−Lz) is stored as an image deviation data Mn(Z). Here, an amount Lz represents a predetermined shift amount to obtain a proper infocus condition. Thus, (n−Lz) represents an amount of defocus.

At step #69, shift data n is increased by "1", such as to "2" at this stage, and at step #70, it is detected whether or not n is equal to (l−k+2). If not, the program returns to step #60 at which the correlation data hn(Z) is cleared to "0". "0", and at next step #61, the cycle number data j is also cleared to "0".

Then, for the next (k−1) cycles of operations through steps #62–#65, since shift data n=2, a difference between the contrast change distribution:

$Ld_1(1)$, $Ld_2(1)$, ..., $Ld_j(1)$, ... and $Ld_{k-1}(1)$ of the standard area and the 1-bit shifted contrast change distribution:

$Rd_2(1)$, $Rd_2(1)$, ..., $Rd_{j+1}(1)$, ... and $Rd_k(1)$ of the reference area is obtained. To this end, a difference between sign data $Ld_j$ in the standard area and 1-bit shifted sign data $Rd_{j+1}$ in the reference area is calculated at step #62 as indicated below:

$Ld_1(Z) - Rd_2(Z)$
$Ld_2(Z) - Rd_3(Z)$
$Ld_3(Z) - Rd_4(Z)$

.
.
.

$Ld_{k-1}(Z) - Rd_k(Z)$

In the same manner as described above, during the above subtractions, the number of occurrences of the discordance is counted in step #63, and the counted result is stored as the correlation data hn(Z).

Then, at step #66, it is detected whether or not n=1. At this stage, since n=2, the program goes to step #67 at which it is detected whether or not the newly obtained correlation data hn(Z) is equal to or smaller than the minimum correlation data Mhn(Z) as so far obtained. If the newly obtained correlation data hn(Z) is smaller than the present minimum correlation data Mhn(Z), the program goes to step #68 to store the newly obtained correlation data hn(Z) as the minimum correlation data Mhn(Z), and also the image deviation data Mh(Z) is rewritten. On the contrary, at step #67, if the newly obtained correlation data hn(Z) is not smaller than the previously obtained minimum correlation data hn(Z), the program goes to step #69 to increase the shift data n by "1".

In this manner, for one zone, after every one bit shift, the comparison between the contrast change distribution along the standard area and the contrast change distribution along the reference area is carried out. Therefore, in total, the comparison is carried out for $n(=1-+2)$ times for one zone.

The above operation (steps #59-#70) is carried out for four zones, so that the minimum correlation data Mhn(Z) (n is between 1 and $1-k+2$ and Z is 1, 2, 3 or 4) and the image deviation data Mh(Z) are obtained for each of the four zones, thereby completing the initial correlation operation (FIG. 7), and making it possible to start the initial correlation low contrast detection operation.

Figure 8:
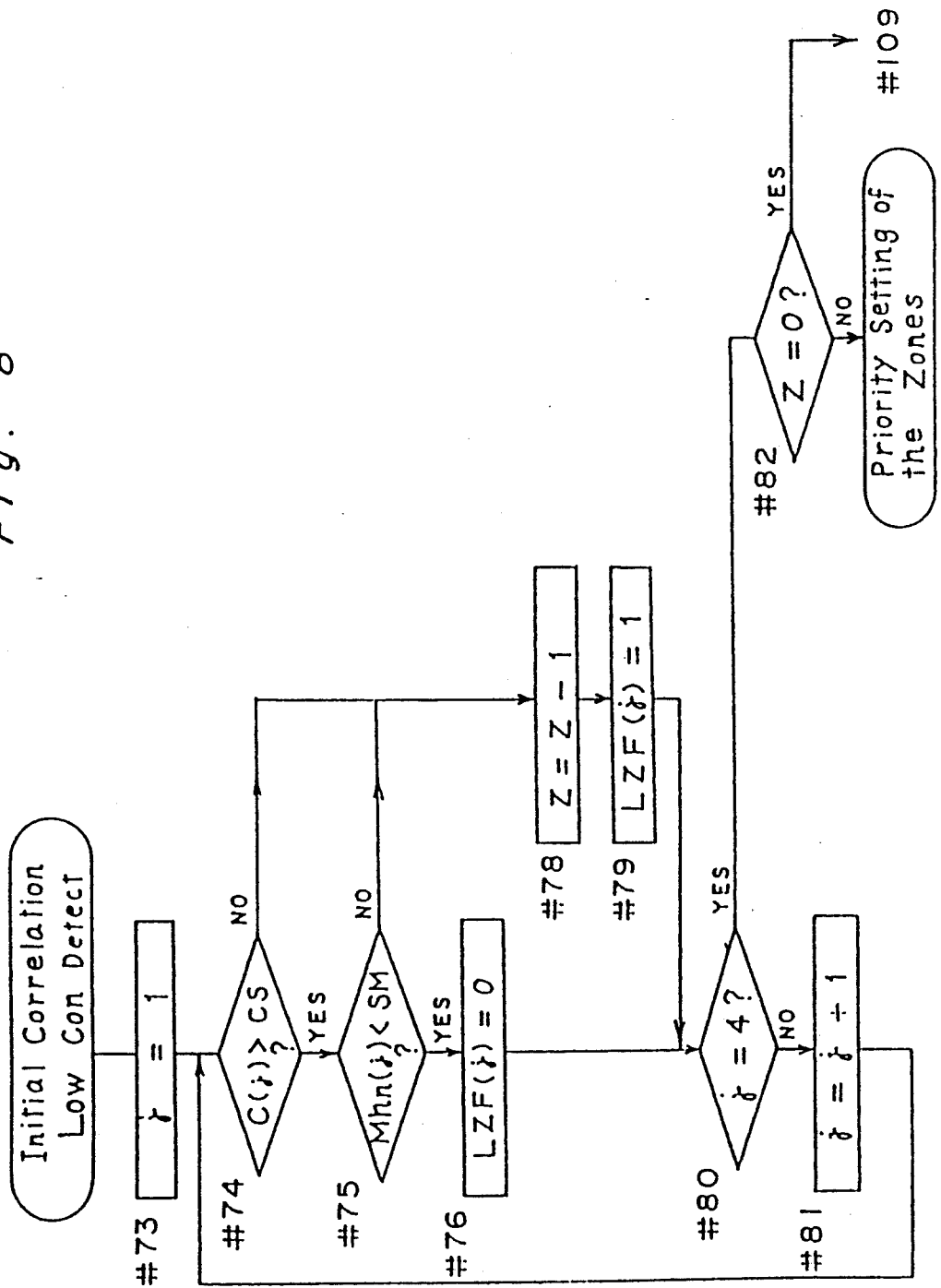

Referring to FIG. 8, the initial correlation low contrast detection routine is shown, in which the low contrast detection is carried out using the calculation result of the cumulative contrast value C(j) obtained from the data initial processing operation (FIG. 6) and the minimum correlation data Min(j) obtained from the initial correlation operation (FIG. 7). In the flow chart of FIG. 8, the variable j is used for representing the zone number which is first set to be "1" at step #73 so as to carry out the low contrast detection with respect to each of the four AF zones. Since step #73 is preceded by step #71 (FIG. 8), the variable Z is now carrying "4". It is detected at step #74 whether or not the cumulative contrast value C(1) for the first AF zone is over a predetermined value CS. At step #75, it is detected whether or not the minimum correlation data Mhn(1) is less than a predetermined value SM.

In the case where the cumulative contrast value C(1) exceeds the predetermined value CS and at the same time, the minimum correlation data Mhn(1) is less than the predetermined value SM, it is so detected that the focus detection can be carried out for the first AF zone, and accordingly, a low contrast zone flag LZF(1) for the first AF zone is reset to be "0" at step #76.

On the other hand, if the contrast value C(1) is under the predetermined value CS, or if the minimum correlation data Mhn(1) is over the predetermined value SM, the variable Z which is initially carrying "4" is reduced to "3" at step #78, and als, it is so detected at step #79 that the focus detection is not possible for the first AF zone, so that the low contrast zone flag LZF(1) for the first zone is set to be "1".

At step #80, it is detected whether j=4 or not. If not, then at step #81, the cycle number data j is increased by 1, and the program returns to step #74 to repeat the steps #74-#79. At step #80, when j=4, the program goes to step #82 detecting whether Z=0 or not. Since Z is decreased from "4" each time the program advances through steps #78 and #79, Z is now carrying a number equal to the number of reset low contrast flags. When there is at least one reset low contrast flag, meaning that there is at least one zone for which the focus detection can be carried out, the program goes to the flow chart of FIG. 9 at which the priority setting of the zones is carried out. On the contrary, when there is no reset low contrast flag, meaning that all four zone are so out of focus that the focus detection can not be carried out, the program goes to step #(FIG. 5a) to carry out the low contrast scan.

Figure 9:
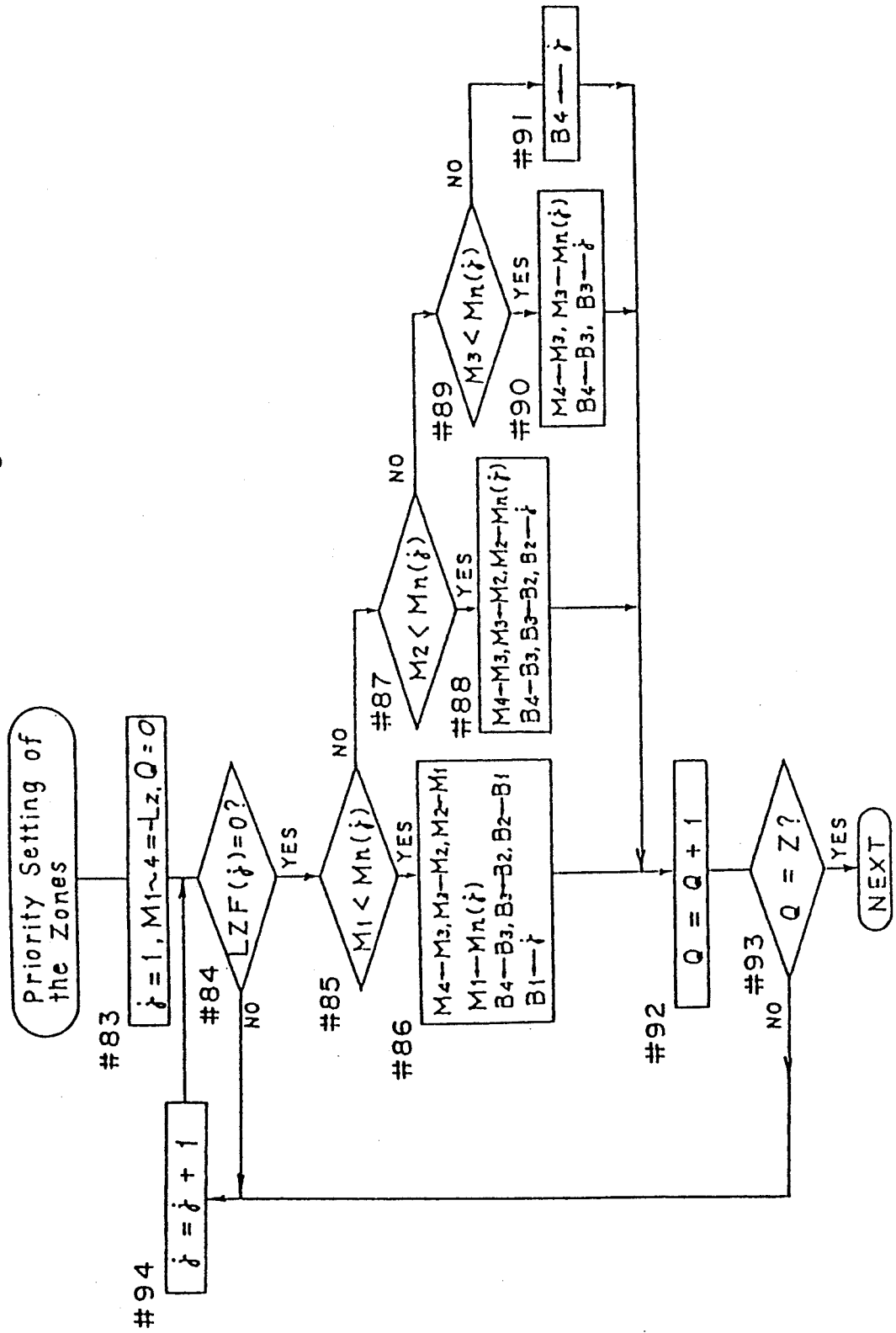

Referring to FIG. 9, a flow chart for setting the priority of zones is shown. At step #83, the zone number data j to be "1", registers M1, M2, M3 and M4 for storing the image deviation data are stored with the minimum image deviation $-Lz$ and a cycle number data Q is set to be "0". At step #84, it is detected whether the low contrast flag LZF(1) for the first zone is reset, or not. If not, meaning that the first zone is so out of focus that the focus detection can not be carried out, then it is not necessary to provide any priority to such a zone. In this case, the program goes to step #94 to add "1" to zone number data j so as to determined the next low contrast flag, e.g., LZF(2). If the second low contrast flag LZF(2) is reset, then the program advances to step #85 at which it is detected whether or not the image deviation data Mn(2) for the second zone is greater than the minimum image deviation $-Lz$. At this stage, obviously the data Mn(2) is greater than the minimum image deviation $-Lz$ as stored in register M1. Therefore, M3 is shifted to register M4, the data in register M2 is shifted to register M3, the data in register M1 is shifted to register M2, and the image deviation data Mn(2) is stored in register M1 in which the highest image deviation data is stored. Similarly, a register B1 is stored with "2" indicating the zone number having the highest priority. Other registers B2, B3 and B4 are stored respectively with the data data, such as "0", in registers B1, B2, and B3. Then, at step #92, the cycle number data Q is increased by "1". Then, at step #93, it is detected whether Q=Z (Z is now carrying a number equal to the number of reset low contrast flags), or not. If not, then the zone number data j is increased by "1", such as to "3", and the program returns to step #83.

At step #84, if the third low contrast flag LZF(3) is reset, then the program advances to step #85 at which it is detected whether or not the image deviation data Mn(3) for the third zone is greater than the image deviation Mn(2) as stored in register M1.

At step #85, if the data Mn(3) is greater than Mn(2), the program advances to step #86 at which the data Mn(3) is store in register M1, and the data Mn(2) is shifted to register M2. Similarly, the present zone number data j, i.e., "3" is stored in register B1, and the zone number data "2" previously stored in register B1 is shifted to register B2, indicating that the third zone has the first priority and the second zone has the second priority.

On the contrary, at step #85, if the data Mn(3) is not greater than Mn(2), the program advances to step #87 at which the data Mn(3) is compared with the minimum image deviation $-Lz$ as stored in register M2. Obviously, the data Mn(3) is greater than the minimum image deviation $-Lz$ as stored in register M2. Therefore, the program goes to step #88 at which the data in registers M2 and M3 are shifted to registers M3 and M4, respectively, and register M2 is stored with the data Mn(3). Similarly, register B2 is stored with the present zone number data j, i.e., "3" indicating that the third zone has the second priority.

In this manner, the zones carrying the reset low contrast flag are given with the priorities, and the first priority is given to the zone which has the smallest image deviation data, i.e., the zone receiving an image of an object located closed to the camera.

Figure 10:
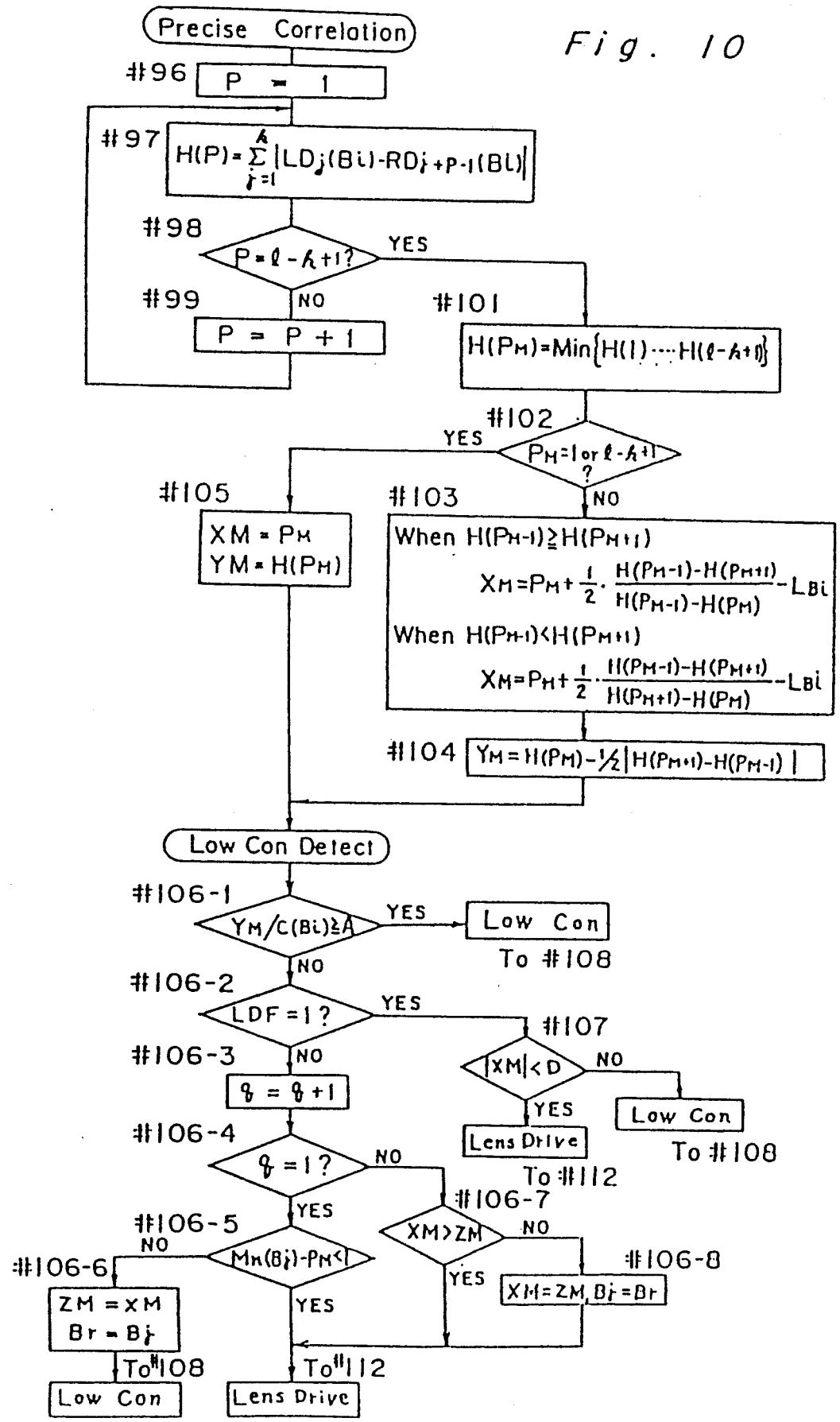
FIG. 10 is a flow-chart showing an operation of a precise correlation routine according to the preferred embodiment of the present invention.

Although the camera of the present embodiment has been described above with the description related to the initial processing, initial correlation, initial correlation low contrast detection and priority setting of the zones, the same function as the above can be achieved in such a manner as that, instead of the calculation (subtraction) in step #97 in FIG. 10 to obtain the precise correlation value of the precise correlation or the initial processing in which the CCD data is binarized by a predetermined value or an average output value of the CCD data, etc., an exclusive logic sum of the two data may be obtained, and the shift position is searched at which the above exclusive logic sum becomes the minimum value, so as to effect the initial correlation.

Referring to FIG. 10, the procedure for the precise correlation will be described in detail.

For the precise correlation value, it is obtained by the sum of the output differences, which are not binarized of outputs of the picture elements in the standard area and the reference area of the zone, as in the case of the initial correlation. More specifically, when each picture element in the standard area of the zone $B_i$ having the highest priority is producing data $LD_j$, and each picture element in the reference area of the zone $B_i$ is producing a data $RD_j$, the precise correlation value $H(p)$ is obtained as follows, $$H(p) = \sum_{j=1}^{k} |LD_j(B_i) - RD_{j+p-1}(B_i)|$$

provided that p changes from 1 to $l-k+1$. Therefore, $l-k+1$ precise correlation values $H(p)$ are obtained through shifting of the reference area picture elements, one bit at a time, for $l-k+1$ times with respect to the standard area picture element array (steps #96-#99). When $l-k+1$ precise correlation values $H(p)$ are obtained, the one $H(PM)$ that has the minimum value is searched (step #101). Thereafter, in step #102, it is detected whether or not the shift amount PM is either one of "1" and $l-k+1$.

When the shift amount PM is neither "1" and $l-k+1$, the program goes to step #103 in which an interpolation calculation result is subtracted by an image deviation $LB_i$ of in-focus condition so as to obtain an image deviation XM.

The interpolation calculation is disclosed in detail in U.S. Pat. No. 4,636,624 of Ishida et al. Therefore, its detail will not be explained herein.

Furthermore, in step #104, the minimum precise correlation value YM is obtained.

On the contrary, in step #102, when the shift amount is either "1" or "$l-k+1$", the interpolation calculation can not be carried out. Therefore, the image deviation XM is set to be equal to the shift amount PM obtained in step #101, and also the minimum value H(PM) calculated in step #101 is regarded as the minimum precise correlation value YM.

Since the image deviation having the minimum precise correlation value can be anticipated from the result $Mn(B_i)$ obtained in the initial processing, it is possible to shorten the calculation period if the calculation is performed only with respect to those adjacent the anticipated image deviation within the selected zone $B_i$.

Based on the minimum precise correlation value YM and the image deviation PM obtained in the above described manner, the low contrast detection is carried out again, if necessary. Here, the condition is such that the minimum precise correlation value YM divided by the contrast value obtained in the initial processing is smaller than a predetermined value A (step #106-1). If the divided value is greater than the predetermined value A, the selected zone is regarded as the low contrast zone, and therefore, the program goes to step #108.

At step #106-2, it is detected whether the operation upto step #128 has been carried out at least for once, or not. If yes, in which case a flag has been set at step #128, the program goes to step #107 to detect whether or not an absolute value of the image deviation XM is smaller than a predetermined value D. If XM is smaller than D, the program goes to step #112 so that the lens is driven based on the image deviation XM. However, if XM is greater than D, it is so assumed that since the image deviation XM is changed abruptly (over the predetermined value D), the object must have been moved out from the selected zone. In such a case, the program goes to step #108 to carry out the CCD integration from the beginning for all the zones.

Since the initial correlation is a simple correlation, there may be a case in which the defocus amount calculated in the initial correlation is greatly different from that obtained from the precise correlation with respect to a particular image. In such a case, it may be possibly happen that an object located more close to the camera is in a zone other than the selected zone. Therefore, in order to positively pick the closest object, the following step are carried out.

At step #106-3, a variable q, which is initially zero, is increased to "1". Then, at step #106-4, it is detected whether or not q=1. If q=1, indicating the first cycle of the operation, the program goes to step #106-5 at which the image deviation $Mn(B_j)$ obtained in the initial correlation is subtracted by the image deviation PM obtained in the precise correlation, and it is detected whether or not the difference therebetween is less than "1" picture element pitch. If the difference is greater than "1" picture element pitch, the program goes to step #106-6 to store the image deviation XM and the selected zone number $B_i$ in registers ZM and Br, respectively. Thereafter, the program goes to step #108. Then, after repeating the another cycle of operation, and when step #106-3 is entered for the second time, the variable q is increased to "2". Thus, the program advances from step #106-4 to step #106-7 in which the newly obtained image deviation XM is compared with that stored in register ZM. If the newly obtained image deviation XM is greater, the program goes to step #112 to drive the lens based on the newly obtained image deviation XM. On the contrary, if the newly obtained image deviation XM is smaller, the program goes to step #106-8 at which the newly obtained image deviation XM and the zone number $B_i$ are replaced with those obtained in the previous cycle as stored in registers ZM and Br (step #106-8). Then, at step #112, the lens is driven based on the previous data. At steps

106-7 and #106-8, the data having a greater image deviation is selected so the the close object can be selected. At step #106-5, if the difference is less than "1" picture element pitch, the program goes to step #112 to drive the lens.

Figure 11:
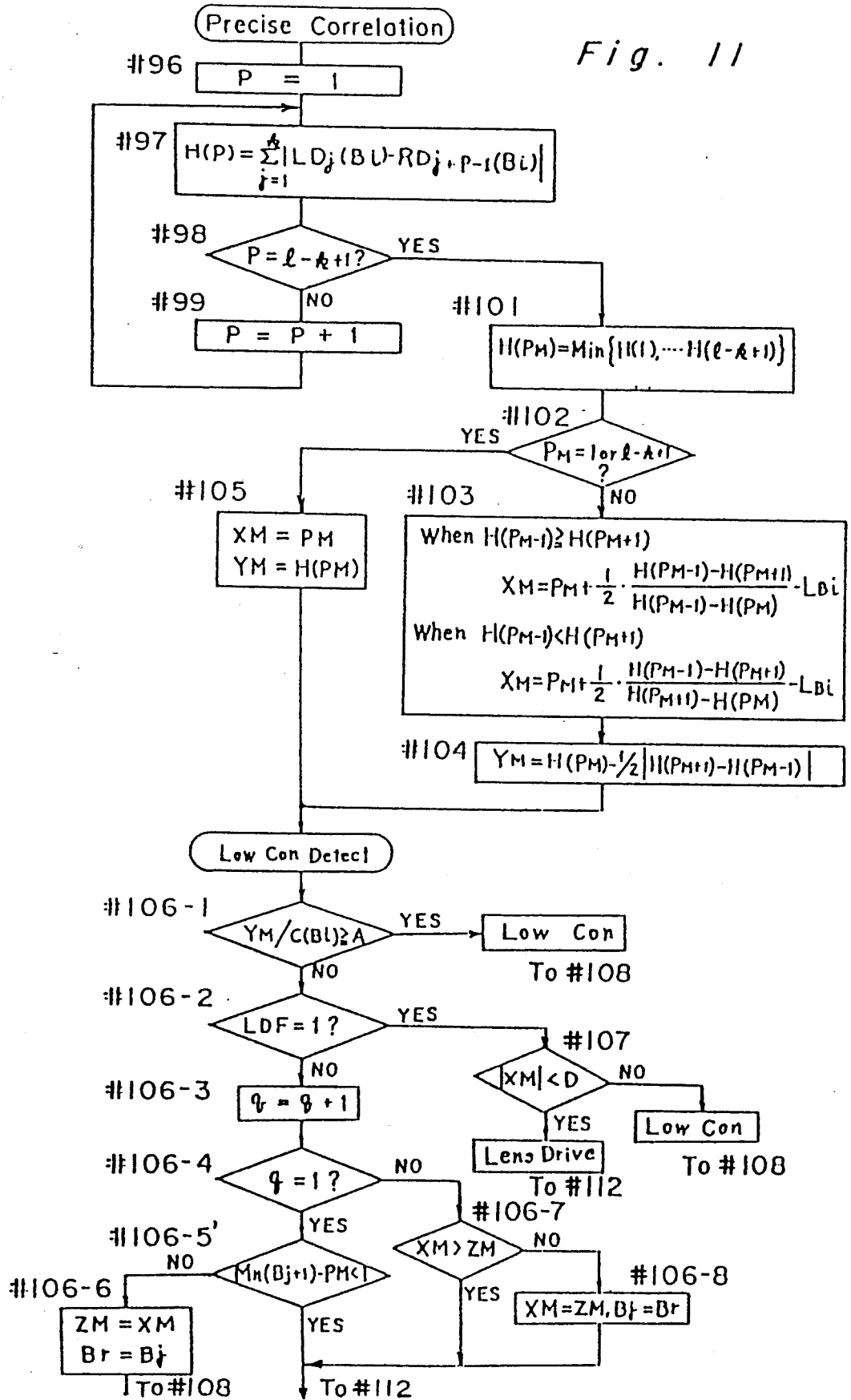
FIG. 11 is a modification of the flow-chart shown in FIG. 10.

Referring to FIG. 11, a flow chart similar to that shown in FIG. 10 is shown. The only difference is in step #106-5' in which the subtraction is conducted by the use of the image deviation $Mn(B_{j+1})$ selected in the initial correlation not as a primary, but as a secondary.

The flow of the whole operation in the camera according to the present embodiment has been fully described above. Hereinbelow, the detailed construction of the electric circuit, the AF sensor CCD and the AF interface AFIF will be described now.

Figure 12A:
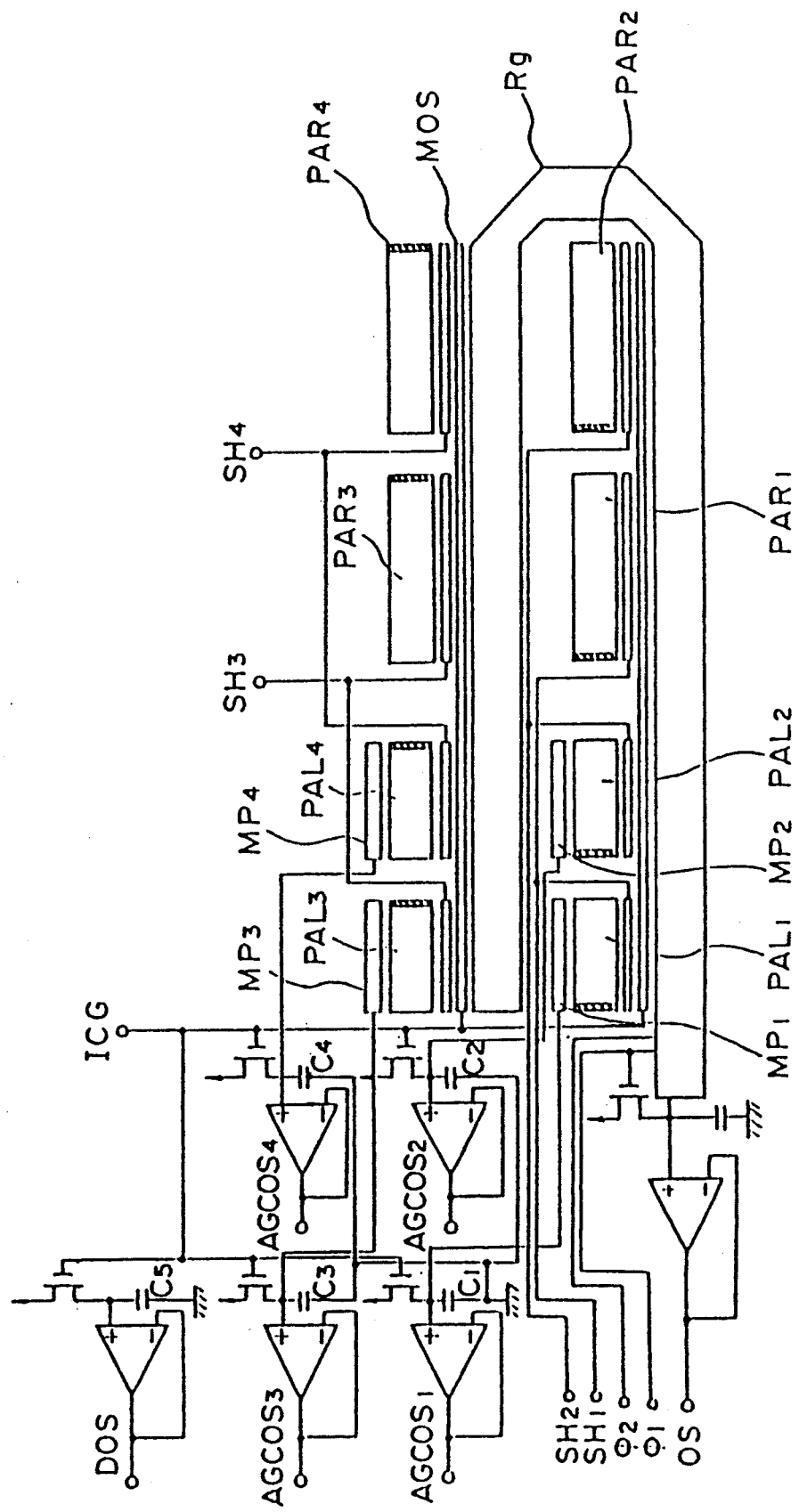
FIGS. 12a and 12b are diagrammatic views respectively showing examples of a structure of a CCD.
Figure 12B:
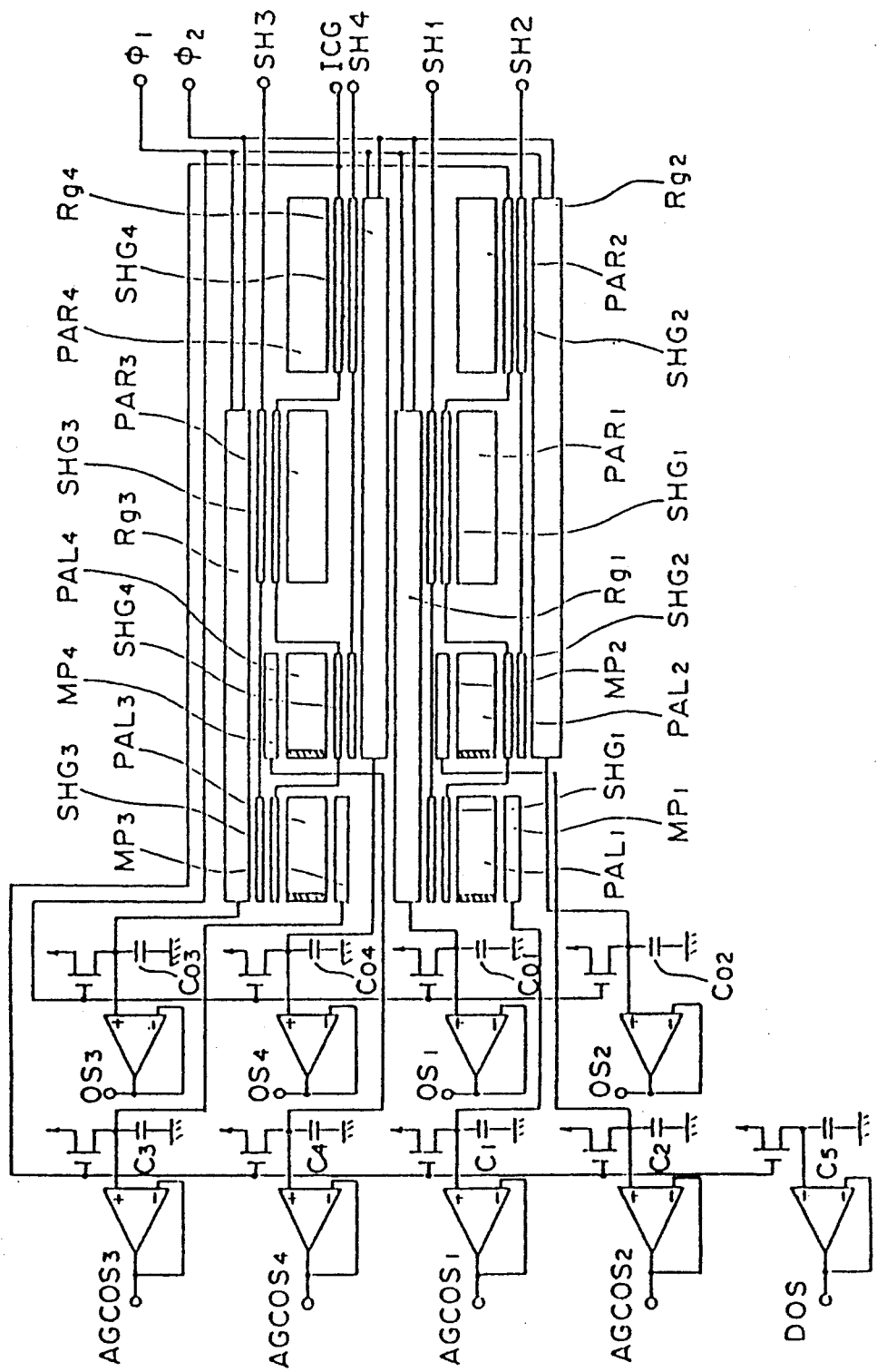

Referring to FIGS. 12a and 12b, two examples of the CCD which is used as an AF sensor in the present embodiment are shown. FIG. 12a shows an example in which CCD output registers are arranged in series (this arrangement is fully described in detail for example in U.S. Patent Application Serial No. 005,413, assigned to the same assignee as the present application), while FIG. 12b shows an example in which CCD output registers are arranged in parallel, each CCD being formed by one-chip.

The construction common to the examples of FIGS. 12a and 12b will first be described. An image in the first to fourth blocks is divided to be formed on the standard area photodiode arrays PAL1-PAL4 as standard area images, and on the reference area photodiode arrays PAR1-PAR4 as reference area images. It is to be noted here that each of the photodiode arrays includes an accumulation part corresponding to the diode array. The standard area photodiode array has k picture elements, while the reference area photodiode array has m picture elements ($k < m$). Adjacent to each of the standard area photodiode arrays PAL1-PAL4, there are disposed respective photodiodes MP1-MP4 for monitoring the brightness of the object to be photographed so as to control the integration time of the CCD. The photocurrent generated in the photodiodes MP1-MP4 discharges the electric charge of respective capacitors C1-C4, which has been charged approximately up to the level of the source current in response to an integration clear gate pulse ICG, at a rate proportional to the amount of the incident light. The voltages across the capacitors are taken out, through buffers having a high impedance input and a low impedance output, and outputted as monitor outputs AGCOS1-4.

The integration clear gate pulse ICG is applied to a MOS gate provided between the accumulation part (photodiode array) and the power source. While the integration clear gate pulse ICG is in a HIGH level, the accumulation part is charged approximately to the level of the source voltage, so that the accumulation is cleared. Thereafter, when the integration clear gate pulse ICG is dropped to a LOW level, the MOS gate is brought into an opened state, thereby discharging the electric charge from the accumulation part, which has been charged to the level of the source voltage, by the photocurrent corresponding to the image brightness distribution generated in the photodiode array. Thus, the information of the brightness distribution will be accumulated in the picture element array.

The MOS gate is provided between the charge accumulation part and the register in each CCD block of the standard area and the reference area. The MOS gates are closed when they are applied with HIGH level SH pulses SH1-SH4, respectively, and the electric charges, accumulated after the application of the integration clear gate pulse ICG to the accumulating part, are transferred to the respective registers.

A DOS circuit is provided for compensating the outputs of monitor outputs AGCOS1-AGCOS4. The DOS circuit is formed by a capacitor C5 and a buffer having the same characteristic as the capacitor and the buffer of the monitor output part, with its input terminals being opened. The charged voltage approximately to the source voltage in response to the integration clear gate pulse ICG is maintained by the DOS circuit even after the disappearance of the integration clear gate pulse ICG.

The difference between the example shown in FIGS. 12a and that shown in FIG. 12b will be explained.

Examples shown in FIGS. 12a and 12b differ from each other in the arrangement of the CCD registers and the succeeding output stages of the CCD registers. In FIG. 12a, a CCD register Rg is arranged in series with respect to each zone, with an output buffer being provided at the end of the CCD register Rg. The CCD register Rg sequentially produce outputs in the order of the standard area in the first zone, the standard area in the second zone, the reference area in the first zone, the reference area in the second zone, the reference area in the fourth zone, the reference area in the third zone, the standard area in the fourth zone and the standard area in the third zone in synchronization with the negative edge of a transfer clock $\phi 1$.

On the other hand, the CCD image sensor shown in FIG. 12b is arranged in parallel structure such that each zone has a different register, and at the end of each register, an output buffer is connected. Thus, there are four buffers in total. Outputs of the standard area and the reference area in the first to fourth zones are sequentially outputted from the first to fourth buffer outputs respectively, in synchronous relation with the negative edge of the transfer clock $\phi 1$.

Moreover, in the CCD image sensor, since control is carried out in the integration time which is different in the four zones, in the case of FIG. 12a, a picture elements indicated by hatched lines is shielded by an aluminum mask, and such a mask is provided at an output end of each of the standard area and the reference area in each zone, so as to correct outputs from the picture elements carrying error signals caused by the dark output level which is greatly changed by the temperatures and the integration time. In the case of FIG. 12b, the adjusting picture elements for adjusting the dark output level are provided at an output end portion of only standard area in each zone, and are used to adjust the output levels of both the standard area and the reference area of each zone.

Next, the AF interface AFIF and the CCD image sensor will be described.

Figure 13:
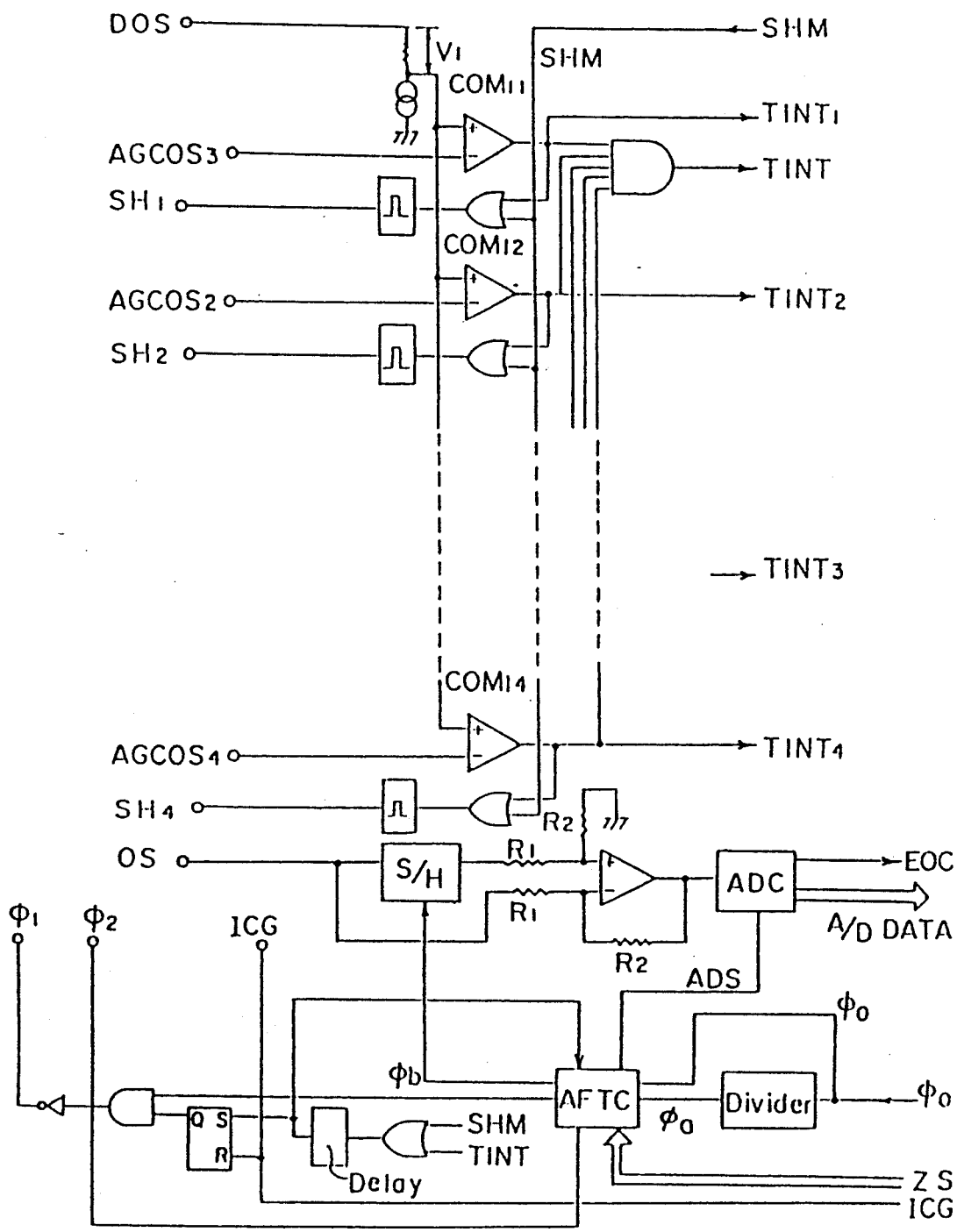

A method for driving the CCD image sensor shown in FIG. 12a having series-connected type CCD register, will be described below in connection with FIG. 13. In FIG. 13, the left-hand side thereof shows a connection part with the CCD image sensor, while the right-hand side thereof shows a connection part with the AF microcomputer AFP. The first CCD integration, after the start of the AF operation, requires outputs from all zones. The integration at this stage is started by the application of the integration clear gate pulse ICG from the AF microcomputer AFP. By the application of the integration clear gate pulse, all the picture element accumulation parts and the monitor outputs of the CCD are initialized. After the pulse disappears, both the accumulation parts and the monitor outputs start the accumulation of photoelectric currents.

An AF timing control circuit AFTC, which receives an original clock $\phi 0$ from the AF microcomputer AFP and a divided clock $\phi a$ prepared by dividing the original clock $\phi 0$, selects the clock $\phi a$ having a frequency suitable for the A/D conversion as a transfer clock, upon application of a command signal, i.e., the AF zone selection signal AFZS from the AF microcomputer AFP, for selecting every zone. The integration clear gate pulse ICG is inputted to a reset input of an R/S flip-flop. Therefore, the R/S flip-flop is reset, so that the transfer clocks $\phi 1$ and $\phi 2$ to be applied to the CCD are maintained, respectively, at a HIGH level and a LOW level. Under this condition, the accumulation in the picture elements proceeds, and at the same time, the accumulation in the monitor is carried out similarly. Thus, a monitor output, which is dropped by a constant level V1 below the compensation output, starts to be produced. The value V1 is previously set so that the electric charges accumulated in the picture element accumulation part are at an average output level suitable for the A/D conversion and focus detection calculation effected at a later stage.

Figure 14:
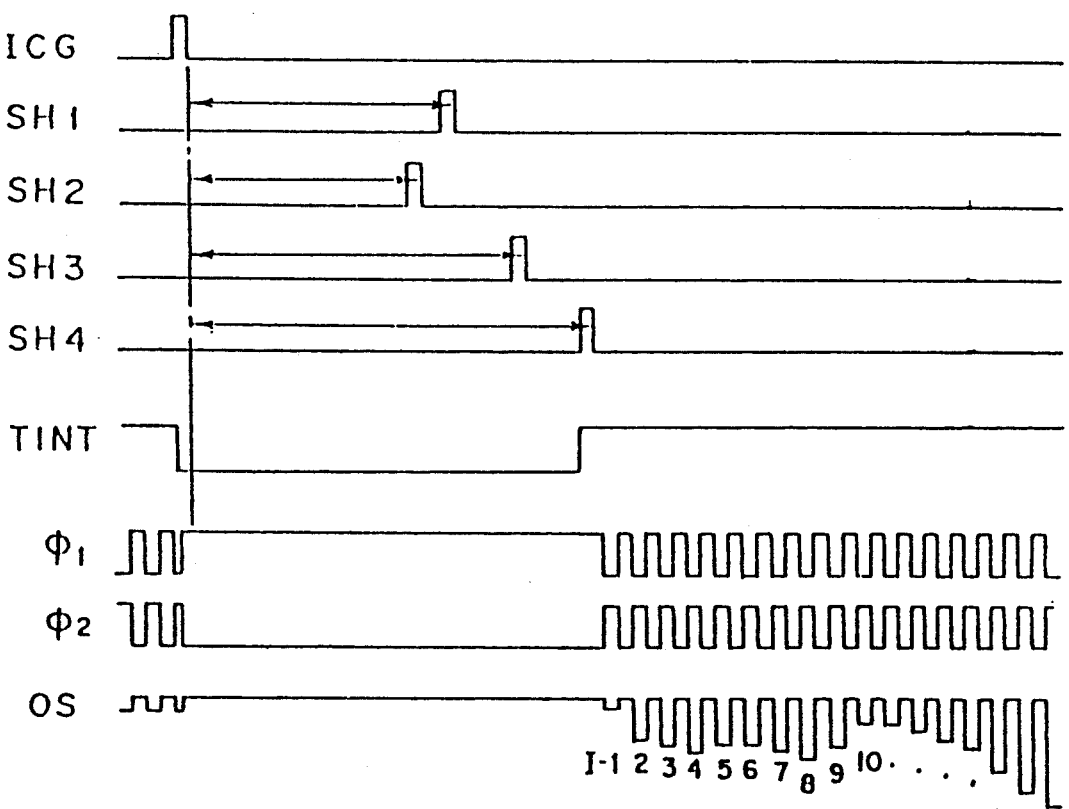
FIG. 14 is a timing chart showing an operation of the circuit of FIG. 13.

Sequentially from the zone receiving higher brightness of the object, each of comparators COM1-1-COM14 produces a HIGH level signal when the input signal to the inverting input exceeds the level V1. The HIGH level signal is applied through an OR gate to a one-shot pulse generator, which thereupon produces a shift pulse SHi (i=1,2,3,4). Each of the shift pulses SH1-SH4 is applied to the CCD image sensor for shifting the electric charges in the picture element accumulation part to respective transferring register. However, since the transfer clock is not supplied to the register, the electric charges corresponding to the potentials in the picture elements are held in the register. In the above-described manner, when all of the comparators COM11-COM14 produce HIGH level signals, i.e., when the output TINT of an AND gate becomes HIGH, the register in each zone is stored with an appropriate average level signal. When the output TINT of the AND gate produces a HIGH level signal, such a HIGH level signal is used as a signal informing the AF microcomputer of the completion of the integration in all zones of the CCD image sensor. Also, the TINT output, after being applied through the OR gate and the delay circuit to R/S flip-flop, is used as a start signal for starting the application of the transfer clock. A waveform of the outputs is illustrated in FIG. 14. Thereafter, each picture element output is generated from the OS terminal in synchronization with the negative edge of clock $\phi 1$. The AF timing control circuit AFTC generates a sampling signal $\phi b$ by counting $\phi 2$ at respective timing when the picture element for adjusting dark output is generated, with supplying an AD start signal ADS to the AD converter ADC.

Thus, the dark output adjustment of the output of the CCD appropriate for the respective integration time is sequentially carried out in the order from the standard area in the first zone, the second zone standard area, the first zone reference area, the second zone reference area, the fourth zone reference area, the third zone reference area, the fourth zone standard area and the third zone reference area, and thereafter the outputs are A/D converted. Then, in synchronism with an A/D conversion completion signal EOC, A/D converted signals are inputted to the AF microcomputer AFP.

The integration drive for the selected zone as effected in step #127 of FIG. 5 will be described with reference to the circuit of FIG. 13.

Figure 15:
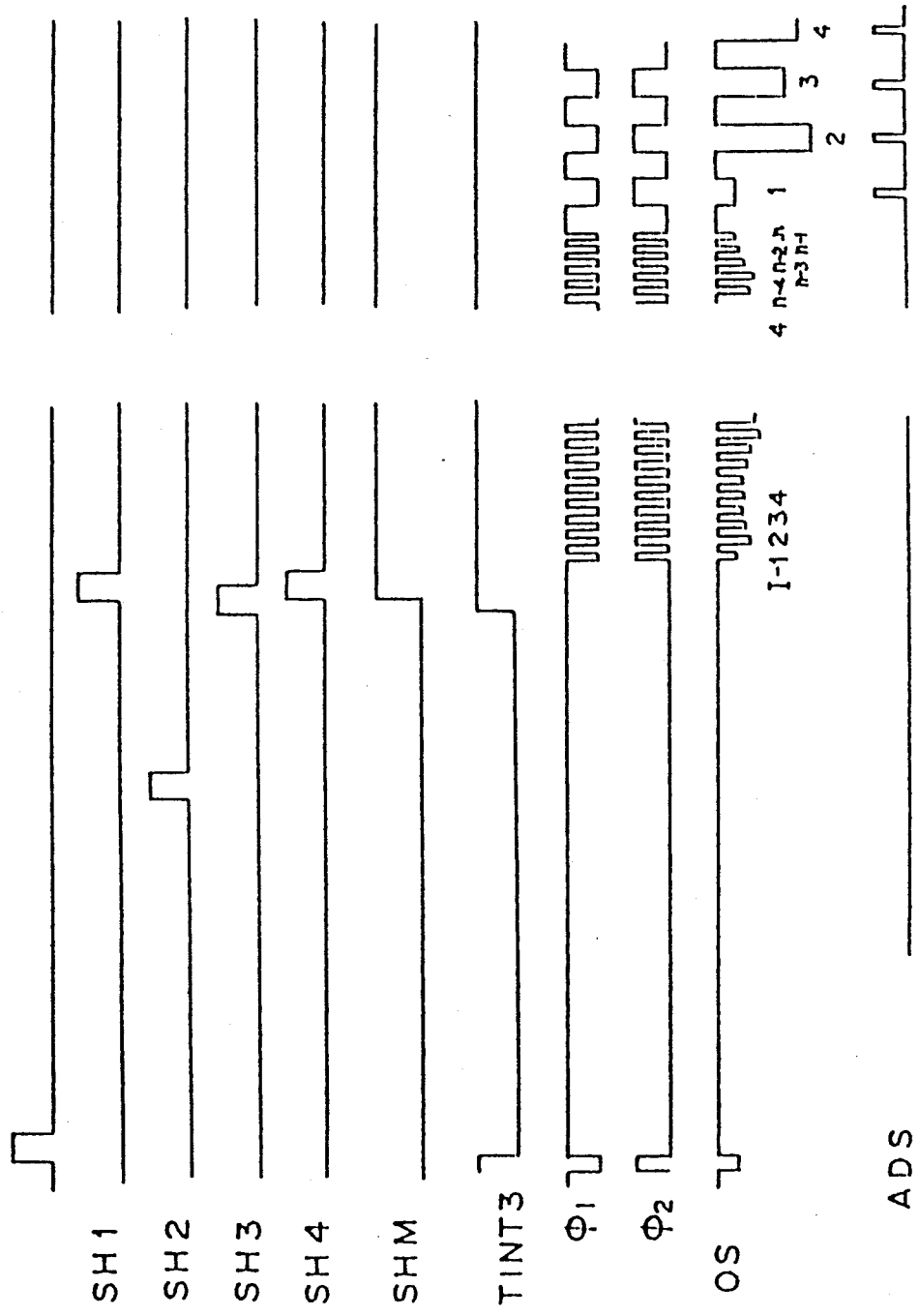
FIG. 15 is a timing chart showing an integration procedure carried out for a selected zone at step #27 of FIG. 5.

When the zone signal SZS is sent to the AF timing control circuit AFTC, a number of transfer clocks required before the signal generation from the zone are set in a counter provided in the circuit AFTC. After the application of the integration clear gate pulse ICG, the AF microcomputer AFP selects an output from outputs TINT1-TINT4 of the monitoring comparators COM1-1-COM14 in the block desired to be outputted. Simultaneously with the generation of a HIGH level signal from the comparator, a manual shift signal SHM is generated to cancel the stop of the transfer clocks $\phi 1$ and $\phi 2$. The AF timing control circuit AFTC whose counter has been set counts the clock $\phi a$, so that the original clock $\phi 0$ is supplied to the CCD until the counter counts a number equal to the set number. A clock for the A/D conversion is supplied to the CCD only when the selected zone produces output. Also, AF microcomputer AFP is supplied with the data only related to the selected zone in synchronous relation with the AFD conversion completion signal EOC. Then the counter is set again. When the other zone produces output, transfer is performed at a high speed. A similar operation is carried out when the remaining picture elements in the attended zone are processed. Thus, in the manner as described above, the waste time such as during the damping time and the integration time of the data can be reduced, thereby enabling a fast AF operation. The timing chart of the above-described operation is illustrated in FIG. 15.

Finally, a method for driving the CCD image sensor having CCD registers connected in parallel relation as shown in FIG. 12b, will be explained in connection with FIG. 16.

Figure 16:
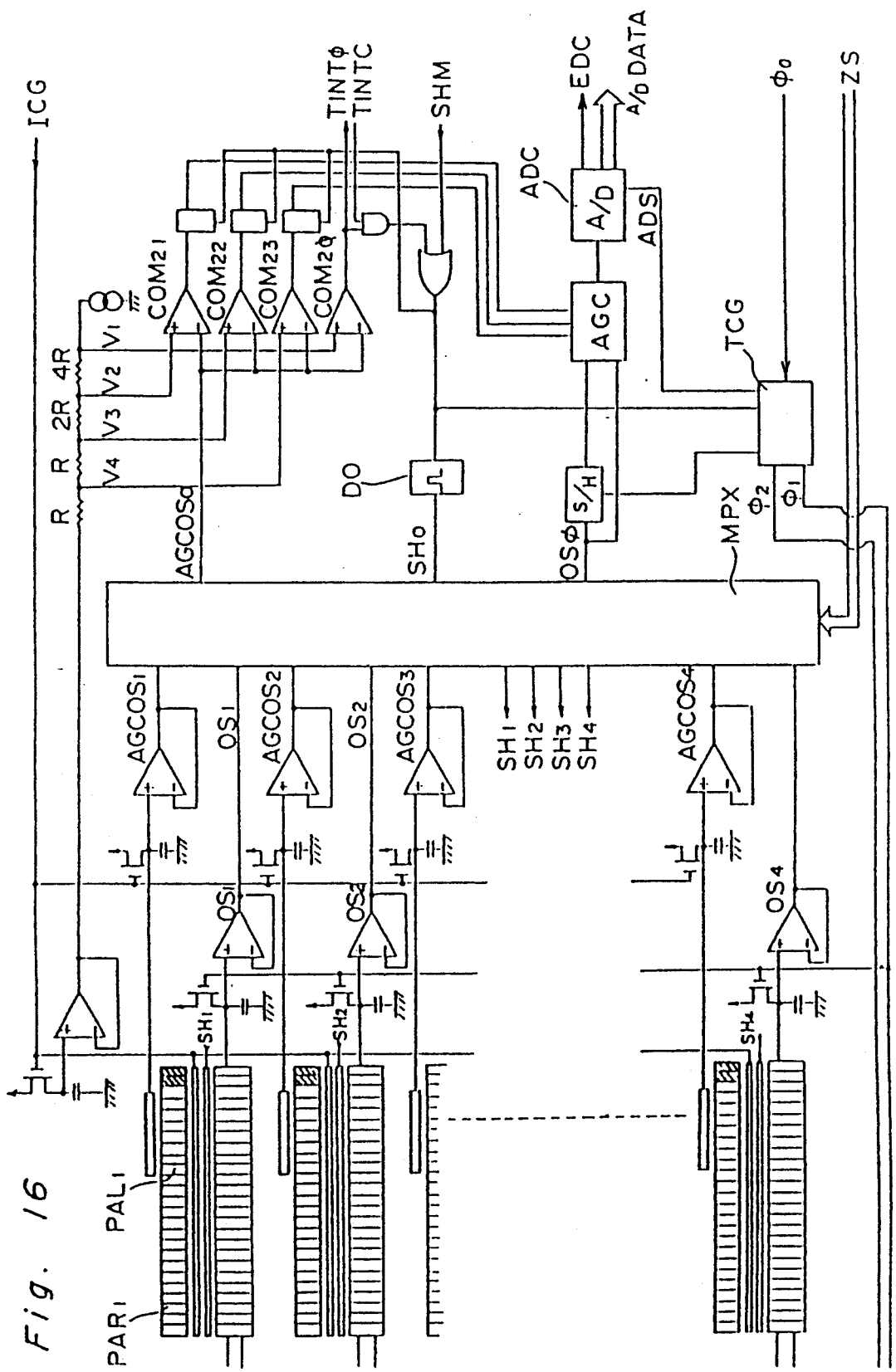
FIG. 16 is a circuit diagram showing an example of a driving circuit for driving the CCD of FIG. 12b.
Figure 17:
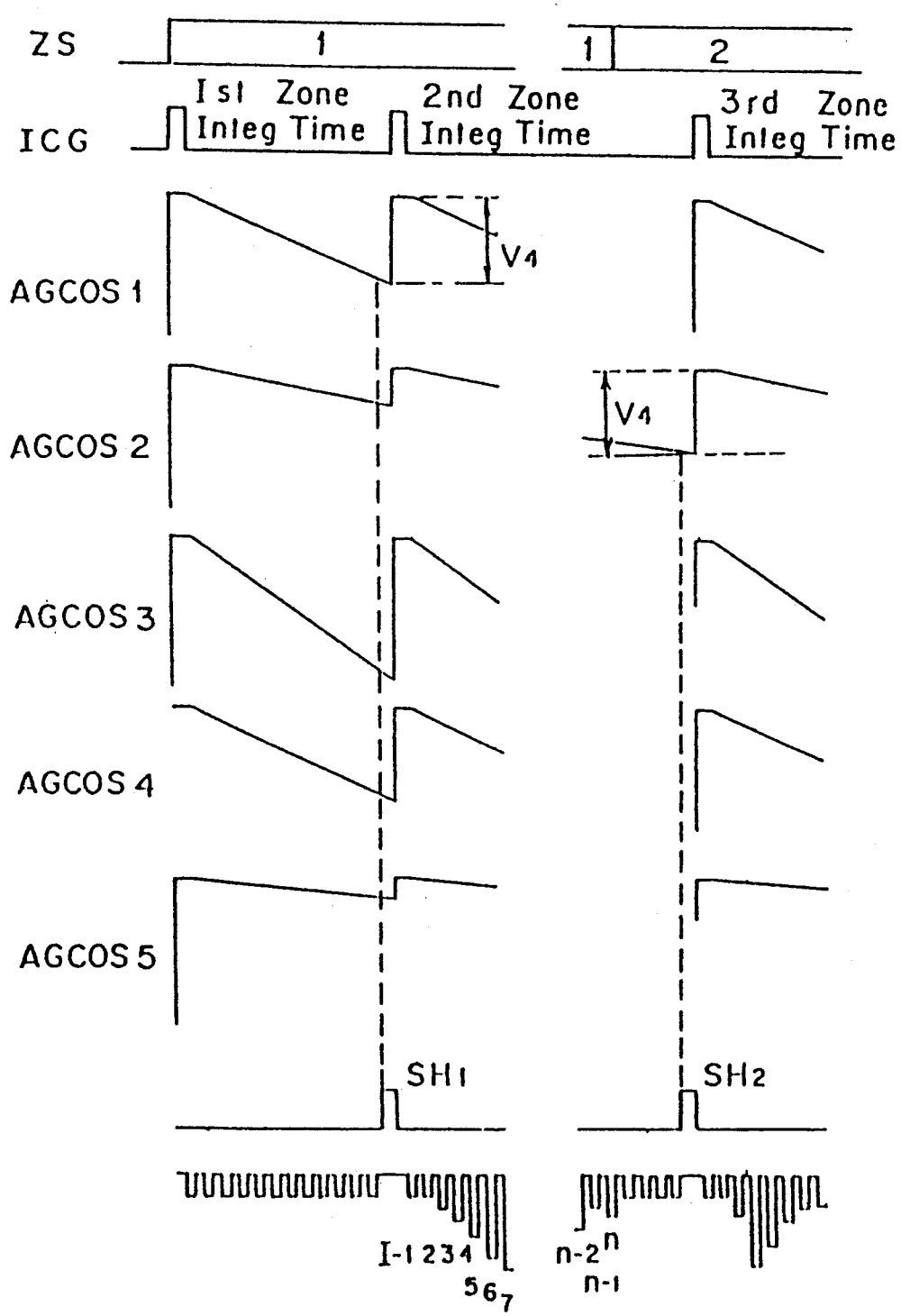
FIG. 17 is a timing chart showing an operation of the circuit of FIG. 16.

In FIG. 16, at the left-hand side thereof the CCD image sensor is shown; at the right-hand side thereof from the multiplexer MPX an AF interface AFIF is shown, and the terminal arrays at the right-hand side thereof are connected to AF microcomputer AFP.

According to the CCD image sensor of FIG. 16, it is possible to reduce the operating time by a special dividing method for effecting the first drive of every zone in the CCD after the start of the AF operation, as described below. The AF microcomputer AFP produces the integration clear gate pulse ICG so as to remove the electric charge accumulated in each of the picture element accumulation parts and the monitors. At this time, by the zone signal ZS indicating the first zone, an input signal AGCOS1 is generated from an output terminal AGCOS0 of the multiplexer MPX, and an input signal SH0 is generated from an output terminal SH1, and an input signal OS1 is generated from an output terminal OS0.

The signal AGCOS1 is monitored by the comparator COM20 through the multiplexer so as to monitor the accumulation of the electric charge of the CCD image sensor for the first zone. As the accumulation of the electric charge in the monitoring part and each picture element part of the first zone is advanced, and the signal AGCOS1 reaches the level V1 suitable for a later analog processing circuit and a later focus detection calculation, comparator COM20 produces a signal which causes the generation of the shift pulse SH0. The shift pulse SH0 is provided through the multiplexer MPX, to the CCD image sensor of the first zone as the shift pulse SH1. When the predetermined maximum integration time has passed without reaching of the signal AGCOS1 to the level V1, the manual shift pulse SHM is applied from the AF microcomputer AFP to multiplexer MPX as the shift pulse SH0. Thereupon, multiplexer MPX supplies the shift pulse SH1 to the CCD image sensor of the first zone.

As a result of the supply of the shift pulse SH1, the CCD image sensor of the first zone terminates the operation for accumulation of the electric charge, and accordingly, the electric charges accumulated in the picture element accumulation part are shifted, through the shift gate, to the CCD shift register Rg1 of the first zone.

At this time, an input signal applied to a delay and one-shot circuit DO for generating the shift pulse SH0 is also applied to the transfer clock generating circuit TCG, which generates two transfer clocks $\phi 1$ and $\phi 2$, the pulse phase is so arranged that the shift pulse SH1 is supplied to the CCD image sensor of the first zone while the transfer clock $\phi 1$ is in a HIGH level. In synchronization with the negative edge of the transfer clock $\phi 1$, the photoelectric output signal OS1 of an image as accumulated in the first zone of the CCD image sensor is sequentially outputted one after another through the output terminal OS0 of the multiplexer MPX.

Immediately after the generation of the shift pulse SH0, the AF microcomputer AFP supplies the second integration clear gate pulse ICG to the CCD image sensor. The second integration clear gate pulse is an integration start signal to the CCD image sensor of the second zone, by which the accumulation operation of the electric charge in the monitor part and the picture element part of the second zone and the discharging operation of the accumulated electric charge are continuously conducted immediately after the completion of the accumulation operation of the electric charge in the first zone.

Thereafter, among the photoelectric output signals OS1 in the first zone, the output of the picture element for adjusting dark output is stored in a sample and hold circuit S/H in accordance with the control of the AF microcomputer AFP. Thereafter, each picture element output signal is subtracted by the stored output signal of the picture element for adjusting dark output, and the obtained difference is inputted as the image information.

In this case, when the accumulation of the electric charge in the CCD image sensor has been forcibly terminated by the manual shift pulse SHM from the AF microcomputer AFP, an automatic gain adjusting circuit AGC automatically adjusts the gain in accordance with the average accumulation level of the output in the monitor part by the use of the outputs of comparators COM20-COM22. In other words, outputs both from the photoelectric output OS0 and from the sample and hold circuit S/H are inputted to the automatic gain adjusting circuit AGC, and the difference therebetween is suitably amplified and outputted. The output of the automatic gain adjusting circuit AGC is inputted to the A/D converting circuit ADC and the converted digital signal is inputted to the AF microcomputer AFP as the image information. After the image information of the first zone is inputted to the AF microcomputer AFP in the above-described manner, the condition is detected of the accumulation of the electric charge of the CCD image sensor in the second zone which has been started previously. To this end, AF microcomputer AFP provides a LOW level signal of the signal TINTC so as to prohibit the manual shift pulse SHM to be used as the shift pulse SH0, and also the zone signal ZS is switched from the first zone to the second zone. As a result, the input signal AGCOS2 is outputted from the output terminal AGCOS0 of the multiplexer MPX, and the input signal SH0 is outputted from the output terminal SH2, and also, the input signal OS2 is outputted from the output terminal OS0.

Then, the AF microcomputer AFP confirms the signal TINT0. If the signal TINT0 is HIGH, the CCD image sensor in the second zone is already charged to a level greater than a certain level, so that the integration clear gate pulse ICG is supplied to the CCD image sensor again to start the accumulation of the electric charge in the CCD image sensor of the second zone again. On the contrary, when the signal TINT0 is LOW, the accumulation of the electric charges in the CCD image sensor of the second zone is not completed while the image information is being taken into the AF microcomputer AFP of the CCD image sensor of the first zone. Therefore, the AF microcomputer AFP changes the TINTC to be HIGH again, waiting for the signal TINT0 to become HIGH. When the signal TINT0 is charged to a HIGH level, or in the case where a predetermined maximum charge accumulation time has elapsed, the shift pulse SH0 is generated and the accumulation of the electric charge in the CCD image sensor of the second zone is completed. Here, the predetermined maximum charge accumulation time is equal to a sum of the time required to receive the image information of the CCD image sensor of the first zone by AF microcomputer AFP and the time needed for the signal TINT0 to become a HIGH level signal. In a similar manner, the charge accumulation of the CCD image sensor and the image information being received from the CCD image sensor are carried out for all zones in a certain order such as: the starting of the charge accumulation of the CCD image sensor in the third zone; the image information being received from the CCD image sensor in the second zone; detection of the condition of charge accumulation in the CCD image sensor in the third zone; and so on.

In the case where a long charge accumulation time is required such as when the object to be photographed has a low brightness, the CCD driving time is shorted by a time represented by a formula (image information receiving time)$\times${(number of zones)$-1$}.

However, in the case where the object to be photographed is not low in brightness and accordingly a long charge accumulation time is not necessary, the CCD driving time will not be shortened.

In the circuit construction shown in FIG. 12b, a buffer part and a shift gate part may be provided between the gates SHG1-SHG4 and the registers Rg1-Rg4, respectively. When such an arrangement is employed, the first shifting operation of the accumulated charge from the accumulation part to the buffer is conducted upon completion of the charge accumulation, even when the object has a high brightness. In the case where the integration completion signal TINT0 has been already generated at the time of the above detection of the charge accumulation condition, the electric charge may be shifted for the second time from the buffer part to the registers Rg1–Rg4, thereby shortening the CCD driving time.

Also, in the circuit construction shown in FIG. 12a, the buffer part and the shift gate part similar to those provided in the circuit of FIG. 12b may be added. When this arrangement is employed, the complicated circuit operation, such as to stop the generation of the transfer clock $\phi 1$ during the charge accumulation operation can be simplified, and at the same time, noise signals caused by such a complicated operation can be suppressed.

Furthermore, although the camera of the above-described embodiment is the so-called AF priority type in which the shutter release is permitted when the lens is brought into the in-focus condition, the present invention is not restricted to this, but may be applied to a camera of a shutter release priority type in which the shutter is released by the shutter-release operation which is done irrespective of the fact whether or not the camera is in the in-focus condition.

Moreover, it is not necessarily required that the focus detection sensitive zone corresponding to the AF zone exactly coincides with the light measuring sensitive zone for controlling the exposure. For example, one sensitive zone for measuring light can cover a wider range including one focus detection sensitive zone. Alternatively, one light measuring sensitive zone excluding the center of the photographing range may be arranged to cover a plurality of the focus detection sensitive zones. In the latter case, it may be so constructed that any one of the plurality of the focus detection sensitive zones can be covered by one light measuring sensitive zone. Further, in order to monitor the condition of the charge accumulation of the respective CCD image sensors, the monitor output may be used as a light measuring signal. Also, the monitor output for monitoring the condition of the charge accumulation of the CCD image sensor of the selected focus detection sensitive zone may be utilized as the information of the light measuring sensitive zone selected in correspondence to the above focus detection sensitive zone.

Furthermore, although the focus adjustment according to the embodiment described above is arranged to give the highest priority to the AF zone in which an object located closest to the camera is contained, instead, it may be so arranged that the lens is automatically focused to an intermediate point between an object located closest to the camera and an object located farthest from the camera, or to an object located farthest from the camera. Furthermore, it may be possible to selectively change the priority of the zones. In this case, it may be so decided at the designing occasion of the camera as to whether the switching of the zone is necessary, on the basis of statistical data of the general photographic situations, such that the most suitable zone for general photographing is selected.

According to the present invention, the focusing condition of the picture-taking lens is detected in multi-zones or multi-points within the photographing frame. Of the plurality of zones or points, the camera automatically selects a particular zone or point, e.g., the zone or point in the photographing frame containing an object located closest to the camera. The camera further selects, from a plurality of light measuring zones, a particular light measuring zone which is located at a place coinciding to the selected focus zone, or at a place covering the selected focus zone so as to use the obtained data for displaying or controlling the exposure. Accordingly, even when the target object is not located at the center of the photographing frame, the exposure can be controlled and display on the basis of the light measuring data with respect to the target object, with no special operation, such as an AE lock operation. Consequently, even when the target object is moving and it is difficult to catch the object at the center of the photographing frame, the exposure data display or the exposure control based on the spot light measuring data with respect to the target object can be conducted with higher possibilities. Moreover, since the exposure is determined by the value of the spot light measuring, the calculated exposure data is less influenced by the brightness in the environment.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as being included therein.

What is claimed is:

1. A camera with a multi-zone detecting device, comprising:
    an objective lens mounted on the camera;
    means for receiving light coming from an object to be photographed through said objective lens, said receiving means including first and second focus detecting blocks separated from each other, each of said first and second focus detecting blocks having a plurality of light receiving elements of a charge accumulation type;
    means for monitoring the amount of light received by said receiving means, said monitoring means including first and second light receiving elements, said first light receiving element being located near the first focus detecting block, said second light receiving element being located near the second focus detecting block;
    means for controlling a charge accumulation time of the first focus detecting block in accordance with output of the first light receiving element of said monitoring means and for controlling a charge accumulation time of the second focus detecting block in accordance with output of the second light receiving element of the monitoring means, and
    means for detecting a focusing condition of said objective lens in accordance with outputs of said first and second focus detecting blocks.

2. A camera as claimed in claim 1, further comprising means for limiting a maximum accumulation time of said light receiving means.

3. A camera as claimed in claim 1, further comprising means for amplifying the respective outputs of said focus detecting blocks, and means for controlling a respective amplifying ratio to be added to respective outputs of said focus detecting blocks.

4. A camera as claimed in claim 1, further comprising means for simultaneously starting the charge accumulating operation of all focus detecting blocks.

5. A camera as claimed in claim 4, wherein said charge accumulation time controlling means includes first means for terminating the charge accumulating operation of the first focus detecting block in accordance with the output of the first light receiving element of said monitoring means, and second means for terminating the charge accumulating operation of the second focus detecting block in accordance with the output of the second light receiving element of said monitoring means, said first and second terminating means being operated independently of each other.

6. A camera as claimed in claim 4, further comprising means for serially producing the outputs of respective focus detecting blocks after the charge accumulating operation of all focus detecting blocks has been terminated.

7. A camera as claimed in claim 1, wherein said firs focus detecting block includes said plurality of light receiving elements arranged in a first direction, said second focus detecting block includes said plurality of light receiving elements arranged in a second direction, said first light receiving element of said monitoring means arranged along said first direction in parallel with said first focus detecting block, and said second light receiving element of said monitoring means arranged along said second direction in parallel with said second focus detecting block.

8. A camera comprising:
an objective lens mounted on the camera;
means for receiving light coming from an object to be photographed through said objective lens, said receiving means including first and second blocks separate from each other, each of said first and second blocks having a plurality of light receiving elements of a charge accumulation type;
means for monitoring the amount of light received by said receiving means, said monitoring means including first and second light receiving elements, said first light receiving element being located near the first block, said second light receiving element being located near the second block; and
means for controlling a charge accumulation time of the first focus detecting block in accordance with output of the first light receiving element of said monitoring means, and for controlling a charge accumulation time of the second block in accordance with output of the second light receiving element of the monitoring means.

9. In an autofocus camera having an objective lens mounted on the camera, the improvement comprising:
means for receiving light coming from an object to be photographed through said objective lens, said receiving means including a plurality of focus detecting blocks each having a plurality of light receiving elements of a charge accumulation type;
means for monitoring the amount of light received by said receiving means, said monitoring means including a plurality of light receiving monitor elements, each being located near the respective focus detecting blocks, corresponding thereto, respectively, and provide separate output signals;
means for controlling a charge accumulation time of the respective focus detecting blocks in accordance with outputs of the corresponding light receiving elements of said monitoring means including means for simultaneously starting the charge accumulating operation of all focus detecting blocks, and means for terminating the charge accumulating operation of each respective focus detecting blocks in accordance with the output signal of its respective monitoring element, whereby a focusing condition of the objective lens can be determined from outputs of the focus detecting blocks.

* * * * *

UNITED STATES PATENT OFFICE
CERTIFICATE OF CORRECTION

Patent No. 5,218,395  Dated June 8, 1993

Inventor(s) Nobuyuki Taniguchi et al.

It is certified that error appears in the above-identified patent and that said Letters Patent is hereby corrected as shown below:

On the cover sheet, please insert:

--[*] Notice: The portion of the term of this patent subsequent to December 18, 2007, has been disclaimed.--

Signed and Sealed this

Twenty-fifth Day of January, 1994

Attest:

BRUCE LEHMAN

*Attesting Officer*  *Commissioner of Patents and Trademarks*